United States Patent
Yoda et al.

(10) Patent No.: US 6,539,035 B1
(45) Date of Patent: Mar. 25, 2003

(54) LASER TRANSMISSION SYSTEM

(75) Inventors: Masaki Yoda, Yokohama (JP); Yuji Sano, Yokosuka (JP); Naruhiko Mukai, Yokohama (JP); Koki Okazaki, Tokorozawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/429,728

(22) Filed: Oct. 29, 1999

(30) Foreign Application Priority Data

Oct. 30, 1998 (JP) .......................... 10-311422

(51) Int. Cl.[7] ................................. H01S 3/30
(52) U.S. Cl. ........................ 372/6; 359/619; 385/38
(58) Field of Search .................. 359/619, 740; 372/6; 348/756; 385/38

(56) References Cited

U.S. PATENT DOCUMENTS

| | | | |
|---|---|---|---|
| 4,305,640 A | 12/1981 | Cullis et al. ............ | 350/96.1 |
| 4,427,261 A | * 1/1984 | Khoe et al. ............. | 385/38 |
| 4,534,615 A | 8/1985 | Iwasaki ................. | 350/6.1 |
| 5,224,200 A | 6/1993 | Rasmussen et al. ....... | 385/146 |
| 5,253,110 A | 10/1993 | Ichihara et al. ........ | 359/619 |
| 5,684,642 A | 11/1997 | Zumoto et al. .......... | 359/740 |
| 6,081,381 A | * 6/2000 | Shalapenok et al. ...... | 359/619 |
| 6,154,259 A | * 11/2000 | Hargis et al. .......... | 348/756 |

FOREIGN PATENT DOCUMENTS

| | | |
|---|---|---|
| EP | 0 717 296 | 6/1996 |
| GB | 2 253 070 | 8/1992 |

OTHER PUBLICATIONS

Katsuro; "Vapor–Phase Film Forming Device of Coherence Reduced Laser"; Patent Abstracts of Japan vol. 009, No. 040; Feb. 20, 1985; JP 59 180519; Oct. 13, 1984; Abstract.

* cited by examiner

Primary Examiner—Paul Ip
Assistant Examiner—Cornelius H. Jackson
(74) Attorney, Agent, or Firm—Foley & Lardner

(57) ABSTRACT

A laser transmission system for transmitting laser beam to an optical fiber comprises a pulse laser oscillator unit, a beam guide unit having an optical condensing unit for condensing a pulse laser beam radiated from the pulse laser oscillator unit, an optical fiber unit for transmitting the pulse laser beam condensed by the optical fiber beam guide unit, and a device for reducing a coherence of the pulse laser beam provided for at least one of the pulse laser oscillator unit, the beam guide unit and the optical fiber unit. This coherence reducing device is for making substantially uniform distribution of laser beams at a beam entrance portion of the optical fiber unit and preventing the laser beams from focussing or converging on one point in the optical fiber unit.

13 Claims, 23 Drawing Sheets

LASER TRANSMISSION SYSTEM

BACKGROUND OF THE INVENTION

The present invention relates to a technique for transmitting or delivering a laser beam using an optical fiber and particularly relates to a laser transmission system particularly of an optical fiber transmission type laser system including a pulse laser oscillator, a beam guide device and an optical fiber capable of transmitting a pulse laser beam having a high peak output in a good state while preventing the optical fiber from being damaged.

In the recent years, in order to ensure preventive maintenance of structures within a nuclear reactor and to intensify the strength of various types of members required to provide high durability, the development of laser peening technique has been progressed and its application is partly considered. In the laser peening apparatus, a pulse laser beam having a peak output as high as, for example, 10 MW or more is employed. The development of a technique for removing the surface layer of a metal material, analyzing elements in fine amount (i.e. microanalyzing elements) or the like using such a pulse laser beam of high peak output has been also performed.

In an apparatus employing a pulse laser beam having a high peak output such as a laser peening apparatus, a spatial (space) transmission using a reflection mirror is normally used as pulse laser beam transmission means. However, if a transmission path is complex and long, or the degree of freedom of a transmission path is required, it is necessary to use many reflection mirrors and accurately manage or control the positions and angles of the mirrors, which results in that the apparatus disadvantageously becomes complicated. In a laser peening apparatus for preventive maintenance of structures in a nuclear reactor, in particular, it is necessary to remotely control the above-stated reflection mirrors to reduce the possibility of exposing operators to radiation. As a result, the apparatus becomes more complicated. Further, in spatial transmission using the reflection mirrors, it is extremely difficult to transmit a pulse laser beam through a long narrow portion such as the interior of a tubing having a diameter of less than 1 cm.

To solve the above problem, demand for transmission using an optical fiber capable of easily realizing beam transmission having high degree of freedom rises. However, when a pulse laser beam of high peak output is introduced inside the optical fiber, the peak output is extremely high and the optical fiber itself may be possibly damaged. As means for avoiding such defect, it has been recently considered to use a beam guide device using the optical fiber by means of image formation or use a taper fiber.

First, an example of a beam guide device by means of image formation will be described. FIG. 22 shows the structure of the device. This device includes an aperture 1 (diameter d), a coupling lens 2 having a magnification m and an optical fiber 3 held by an optical fiber holder 3a sequentially arranged on the optical path of a pulse laser beam L. An aperture surface A and an optical fiber end face B are arranged to be conjugated with each other (or to have image-formation relationship). The position of the aperture 1 is set such that an extreme peak is not included in the energy density distribution of a cut pulse laser beam L.

In the device constituted as stated above, a pulse laser beam L is cut by the aperture 1 (beam diameter d) and the cut image is reduced by the image-formation lens 2 (beam diameter md) and projected onto the optical fiber end face B (core diameter a>md). In such structure, the pulse laser beam L does not include the extreme peak of the energy density at the aperture cutting position. According to this matter, the extreme peak of the energy density is not included in the optical fiber end face B and it is, therefore, possible to avoid the damaging of the optical fiber 3 on the optical fiber end face B.

Next, an example of a taper fiber will be described. FIG. 23 shows the structure of the taper fiber. The taper fiber 4 to be used is an optical fiber having a tapered cross section on the beam incidence side end portion, and the core diameter $a_0$ of the fiber 4 on the end face is larger than the core diameter $a$ of a fiber main portion ($a_0 > a$).

A pulse laser beam L is first condensed (converged) by a condensing lens 5 and then applied onto the end face of the taper fiber 4, with a beam diameter $d$ larger than the core diameter $a$ of the optical fiber at the central portion and smaller than the core diameter $a_0$ on the end face ($a_0 > d > a$). Accordingly, the energy density of the pulse laser beam L on the optical fiber end face can be reduced, and therefore, the optical fiber on the end face can be prevented from being damaged.

Meanwhile, in the beam guide device by means of image formation shown in FIG. 22, it is possible to avoid the damaging of the optical fiber by removing the local peak of the energy density on the optical fiber end face. Within the optical fiber, however, a laser beam having a high directivity is reflected on the interface between a depressed core and a clad, so that the laser beam is converged finely to thereby damage the optical fiber.

Furthermore, even with the taper fiber shown in FIG. 23, although it is possible to avoid the damaging of the optical fiber by reducing the energy density of a laser beam on the optical fiber end face, the laser beam is converged within the optical fiber by the same function as that mentioned above, and the optical fiber is thereby damaged.

As mentioned above, it has been recently desired to transmit a pulse laser beam of a high peak output by using an optical fiber. However, any means for realizing such desire has not yet been provided.

As described above, although conventional techniques can avoid the damaging of an optical fiber on the end face thereof, the problem with these techniques is that they cannot prevent the damaging of the optical fiber resulting from the convergence of the laser beam in portions other than the optical fiber end face.

SUMMARY OF THE INVENTION

It is an object of the present invention to substantially eliminate defects or drawbacks encountered in the prior art mentioned above and to provide a laser transmission system for transmitting laser beam by means of an optical fiber capable of transmitting or delivering a pulse laser beam of high peak output without damaging the optical fiber.

This and other objects can be achieved, according to the present invention, by providing a laser transmission system using an optical fiber, comprising:

a pulse laser oscillator unit;

a beam guide unit having an optical condensing unit for condensing a pulse laser beam radiated from the pulse laser oscillator unit;

an optical fiber unit for transmitting the pulse laser beam condensed by the beam guide unit; and means for reducing a coherence of the pulse laser beam provided for at least one of said pulse laser oscillator unit, said beam guide unit and said optical fiber unit.

In this aspect, the coherence reducing means is a means for making substantially uniform distribution of laser beams at a beam entrance portion of the optical fiber unit and preventing the laser beams from focussing on one point in the optical fiber unit.

In preferred embodiments of the laser transmission system mentioned above, the pulse laser oscillator unit comprises a laser resonator including a rear mirror, an oscillator, an outgoing mirror and a pulse generator, the rear mirror having a beam reflection surface subjected to a matte finish treatment. The laser oscillator unit may comprise a laser resonator including a rear mirror, an oscillator, an outgoing mirror, a pulse generator, and a diffusion optical fiber through which an outgoing beam from the laser resonator passes. The laser oscillator unit may comprise a laser resonator including a rear mirror, an oscillator, an outgoing mirror, a pulse generator, and an optical fiber plate through which an outgoing beam from the laser resonator passes. The laser oscillator unit may comprise a laser resonator including a rear mirror, an oscillator, an outgoing mirror, a pulse generator, and a kaleidoscope through which an outgoing beam from the laser resonator passes. The laser oscillator unit may comprise a laser resonator including a rear mirror, an oscillator, an outgoing mirror, a pulse generator, and a beam transmitting plate for diffusion through which an outgoing beam from the laser resonator passes. The laser oscillator unit may comprise a laser resonator including a rear mirror, an oscillator, an outgoing mirror, a pulse generator, and a lens array through which an outgoing beam from the laser resonator passes.

The beam guide unit includes an optical fiber plate through which the pulse laser beam passes and a condensing optical device for condensing an outgoing beam from the optical fiber plate to the optical fiber unit.

The beam guide unit may include a kaleidoscope through which the pulse laser beam passes and a condensing optical device for condensing an outgoing beam from the kaleidoscope to the optical fiber unit. The beam guide unit may include a beam transmitting plate for diffusion through which the pulse laser beam passes and a condensing optical device for condensing an outgoing beam from the beam transmission plate to the optical fiber unit. The beam guide unit may include a lens array through which the pulse laser beam passes and a condensing optical device for condensing an outgoing beam from the lens array to the optical fiber unit.

The optical fiber unit has a central core having at least one end formed in a prismatic shape.

According to the invention, at least one of the pulse laser oscillator unit, the beam guide unit and the optical fiber unit is provided with means for reducing the coherence of a pulse laser beam, whereby a pulse laser beam of the high peak output can be transmitted while preventing the optical fiber from being damaged.

According to the invention according to the present invention of the aspect mentioned above, a pulse laser beam having the low spatial coherence and a wide spread angle indicative of directivity is radiated from a pulse laser oscillator unit. Due to this matter, such a pulse laser beam is not converged finely within the optical fiber even if the pulse laser beam is introduced into the transmission pulse laser beam. Thus, by employing this pulse laser oscillator unit as a beam source, a pulse laser beam having high peak output can be transmitted through the optical fiber without damaging the optical fiber.

Further, according to the invention according to the eighth to eleventh aspects, a pulse laser beam having high spatial coherence is introduced after being passed through a beam guide device to thereby reduce the spatial coherence thereof and to make the spatial intensity distribution thereof uniform. Owing to this matter, the pulse laser beam is not converged finely within the pulse laser beam and does not have a local intensity peak at the introduction (entrance) portion of the optical fiber, and the optical fiber is not damaged. Thus, by employing this optical fiber beam guide device, a pulse laser beam having a high peak output can be transmitted without damaging the optical fiber.

Furthermore, since the end portion of the core of a transmission optical fiber is formed into prism-shape, a pulse laser beam is guided to the optical fiber and is not converged finely within the optical fiber and the optical fiber is not damaged. Thus, if this optical fiber is used, a pulse laser beam having high peak output can be transmitted without damaging the optical fiber itself.

The nature and further characteristic features can be made more clear from the following descriptions made with reference to the accompanying drawings.

DESCRIPTION OF THE PREFERRED EMBODIMENTS

Now, the embodiments of the present invention will be described with reference to the accompanying drawings.

Figure 1:
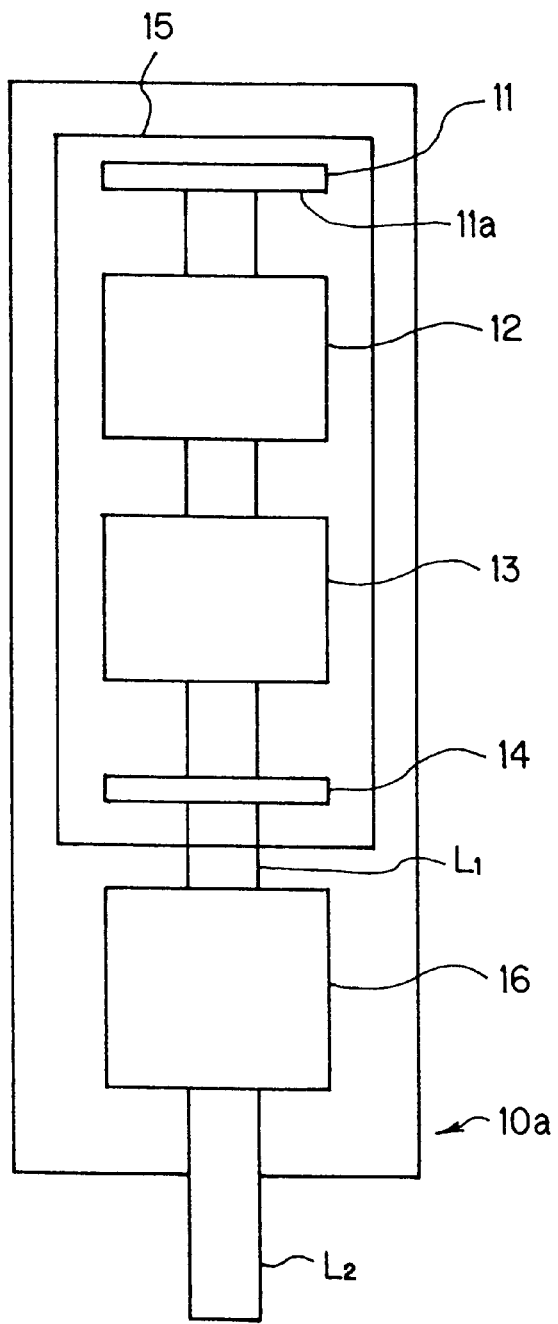
FIG. 1 is a view showing a structure of a pulse laser oscillator in a first embodiment according to the present invention.

First Embodiment (FIG. 1)

FIG. 1 is a view showing a structure of a pulse laser oscillator unit.

The pulse laser oscillator unit $10a$ in this embodiment is a Q-switch type laser oscillator and comprises a laser resonator 15 comprising a rear mirror 11, a Q-switch 12, an oscillator 13 and an outgoing mirror 14 and a beam amplifier 16. As the oscillator 13, a YAG laser rod using a flash lamp as an excitation beam source, for example, or the like is applied. As the rear mirror 11 and the outgoing mirror 14, plane reflection mirrors, for example, or the like are used, which constitute a Fabry-Perot resonator or the like.

With such structure, a surface $11a$ serving as the reflection surface of the rear mirror 11 is subjected to a matte finish treatment. The grain size of the matte finished surface is, for example, #245 to 1500 in matte number prescribed by JIS (Japan Industrial Standard).

Next, the function of this Q-switch type laser oscillator unit $10a$ will be described. A pulse laser beam $L_1$ having a short time width by the Q-switch and a high peak output rate with respect to an average output is radiated from the laser resonator 15. Since the surface $11a$ of the rear mirror 11 of the laser resonator 15 is a sand finished surface, the pulse laser beam $L_1$ is diverged in an appropriate manner. The pulse laser beam $L_1$ radiated from the laser resonator 15 is transmitted to the beam amplifier 16, where the pulse laser beam $L_1$ is amplified into a pulse laser beam $L_2$ having very high peak output. Since the pulse laser beam $L_1$ before amplification is appropriately diverged, the pulse laser beam $L_2$ after amplification is also appropriately diverged. That is, the pulse laser beam $L_1$ having low spatial coherence and a wide spread angle indicative of directivity is radiated from this Q-switch type laser oscillator unit $10a$, compared with a case where the surface of the rear mirror 11 of the laser resonator 15 is a mirror finished surface, and the pulse laser beam $L_2$ after the amplification is also low in coherence and wide in spread angle.

The term "coherence" used herein means a term showing degree of occurrence of interference fringe of light (beam). A light such as laser beam causing the coherence has waves and phases in good alignment (high coherence), and the laser beam having the high coherence provides high interference and directivity and, hence, can be converged on a very small point or area. Accordingly, the meaning of the term "means for reducing the coherence" is means (device) for reducing the coherence of beam in space or time to thereby disturb the directivity thereof and prevent it from being converged on one point and also to make possibly uniform the spatial intensity distribution of the laser beam.

In this embodiment having the structure mentioned above, due to the fact that the surface $11a$ of the rear mirror 11 of the laser resonator 15 is a matte finished surface, a pulse laser beam $L_2$ having a low spatial coherence and a wide spread angle indicative of directivity is radiated from this Q-switch type laser oscillator unit $10a$. Such a pulse laser beam $L_2$ has higher spatial coherence and the diameter of a condensed (converged) beam flux is large compared with an ordinary pulse laser beam having a narrow spread angle indicative of directivity if each pulse laser beam is condensed by using the same condensing optical system. Namely, even if the pulse laser beam $L_2$ is introduced into a transmission optical fiber, the laser beam is not converged finely within the optical fiber. Thus, if this Q-switch type laser oscillator unit $10a$ is used as a beam source, a pulse laser beam having a high peak output can be transmitted by the optical fiber without damaging the optical fiber.

Figure 2:
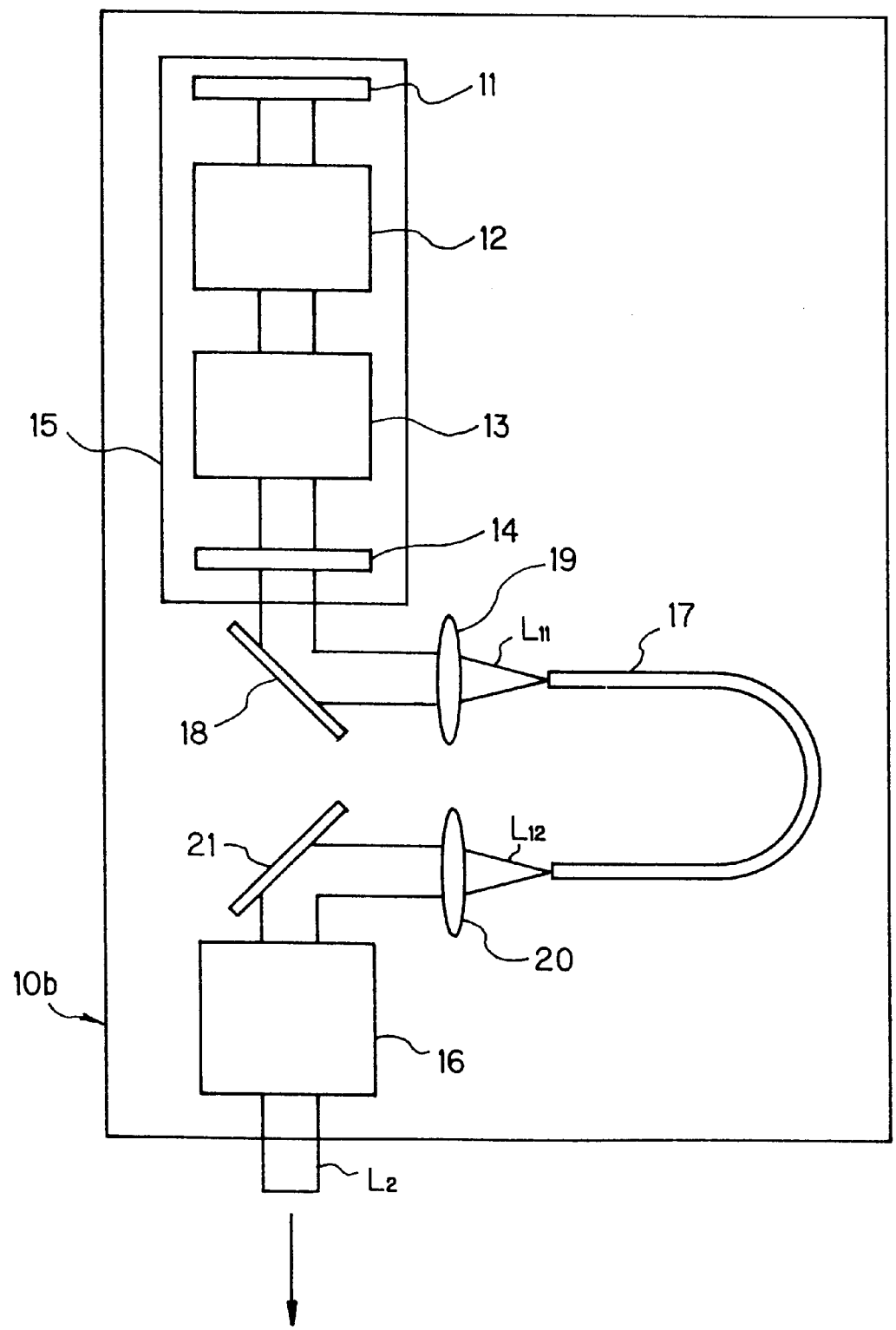
FIG. 2 is a view showing a structure of a pulse laser oscillator in a second embodiment according to the present invention.

Second Embodiment (FIG. 2)

Next, the second embodiment of the present invention will be described. FIG. 2 is view showing a structure of a pulse laser oscillator unit in the second embodiment according to the present invention.

The pulse laser oscillator unit $10b$ is a Q-switch type laser oscillator and has the same laser resonator 15 as that in the first embodiment except that the surface of a rear mirror 11 is a mirror finished surface. The same reference numerals or symbols as those in FIG. 1 denote the constituent elements of this laser resonator 15 in FIG. 2 and the description thereto will not be given herein.

In this embodiment, an optical fiber 17 for beam diffusion (diffusion optical fiber) is provided at the beam emitting position of the laser resonator 15. As the diffusion optical fiber 17, an optical fiber of, for example, step index type having a quartz core is applied and the fiber 17 is, for example, formed into a U-shape. A pulse laser beam $L_{1\,1}$ radiated from the laser resonator 15 enters the diffusion optical fiber 17 from one end side thereof through the first reflection mirror 18 and a condensing lens 19 and radiated from the other end side thereof as a pulse laser beam $L_{1\,2}$. The pulse laser beam $L_{1\,2}$ is introduced to a beam amplifier 16 through the second condensing lens 20 and a reflection mirror 21, amplified and then radiated as a pulse laser beam $L_2$.

Next, the function of this Q-switch type laser oscillator unit $10b$ will be described in detail. A pulse laser beam $L_{1\,1}$ having a short time width, a low average output and a high peak output rate with respect to the average output is radiated from the laser resonator 15. The pulse laser beam $L_{1\,1}$ is bent by the first reflection mirror 18, condensed (converged) by the first lens 19 and introduced into the diffusion optical fiber 17 from one end portion thereof. Since the pulse laser beam $L_{1\ 1}$ from the laser resonator 15 has low average output, the peak output thereof is relatively low and the diffusion optical fiber 17 is, therefore, not damaged.

Thereafter, the pulse laser beam $L_{1\ 1}$ is transmitted while being repeatedly reflected within the optical fiber 17 and radiated from the other end portion of the optical fiber 17 as a pulse laser beam $L_{1\ 2}$ having a certain spread angle. The pulse laser beam $L_{1\ 2}$ radiated from the diffusion optical fiber 17 is converted into an almost parallel beam flux by the second lens 20. It is noted, however, that the beam flux, which has been repeatedly reflected within the diffusion optical fiber 17, is a laser beam having low spatial coherence and a wide spread angle indicative of directivity unlike the ordinary laser beam. Further, due to the fact that the pulse laser beam $L_{1\ 2}$ has been repeatedly reflected within the diffusion optical fiber 17, the spatial intensity distribution of the pulse laser beam $L_{1\ 2}$ is made uniform.

After being bent by the second reflection mirror 21, this pulse laser beam $L_{1\ 2}$ is transmitted to the beam amplifier 16 and amplified into a pulse laser beam having very high peak output. Since the pulse laser beam $L_{1\ 2}$ before the amplification is appropriately diverged, the pulse laser beam $L_2$ after the amplification is also appropriately diverged. In addition, since the pulse laser beam $L_{1\ 2}$ before the amplification has a uniform intensity distribution, the pulse laser beam $L_2$ after the amplification also has a uniform intensity distribution. Namely, this Q-switch type laser oscillator unit 10b radiates a pulse laser beam $L_2$ having a uniform spatial intensity distribution, low spatial coherence and a wide spread angle indicative of directivity compared with an ordinary Q-switch type laser oscillator.

According to this embodiment, the diffusion optical fiber 17 is inserted between the laser resonator 15 and the beam amplifier 16. Therefore, the Q-switch type laser oscillator unit 10b radiates the pulse laser beam $L_2$ having a uniform spatial intensity distribution, a low coherence and a wide spread angle indicative of directivity.

The pulse laser beam $L_2$ in this embodiment has a high spatial coherence, and the diameter of a condensed beam flux is large compared with an ordinary pulse laser beam having a narrow spread angle indicative of directivity if each laser beam is condensed by using the same condensing optical system. That is to say, even if the pulse laser beam $L_2$ is introduced into a transmission optical fiber, the laser beam is not converged finely within the optical fiber. Further, since the intensity distribution of the pulse laser beam $L_2$ is uniform, no local intensity peak appears at the introduction portion of the transmission optical fiber.

Thus, if the Q-switch type laser oscillator unit 10b is used as a beam source, a pulse laser beam of a high peak output can be transmitted by the transmission optical fiber without damaging the optical fiber.

Figure 3:
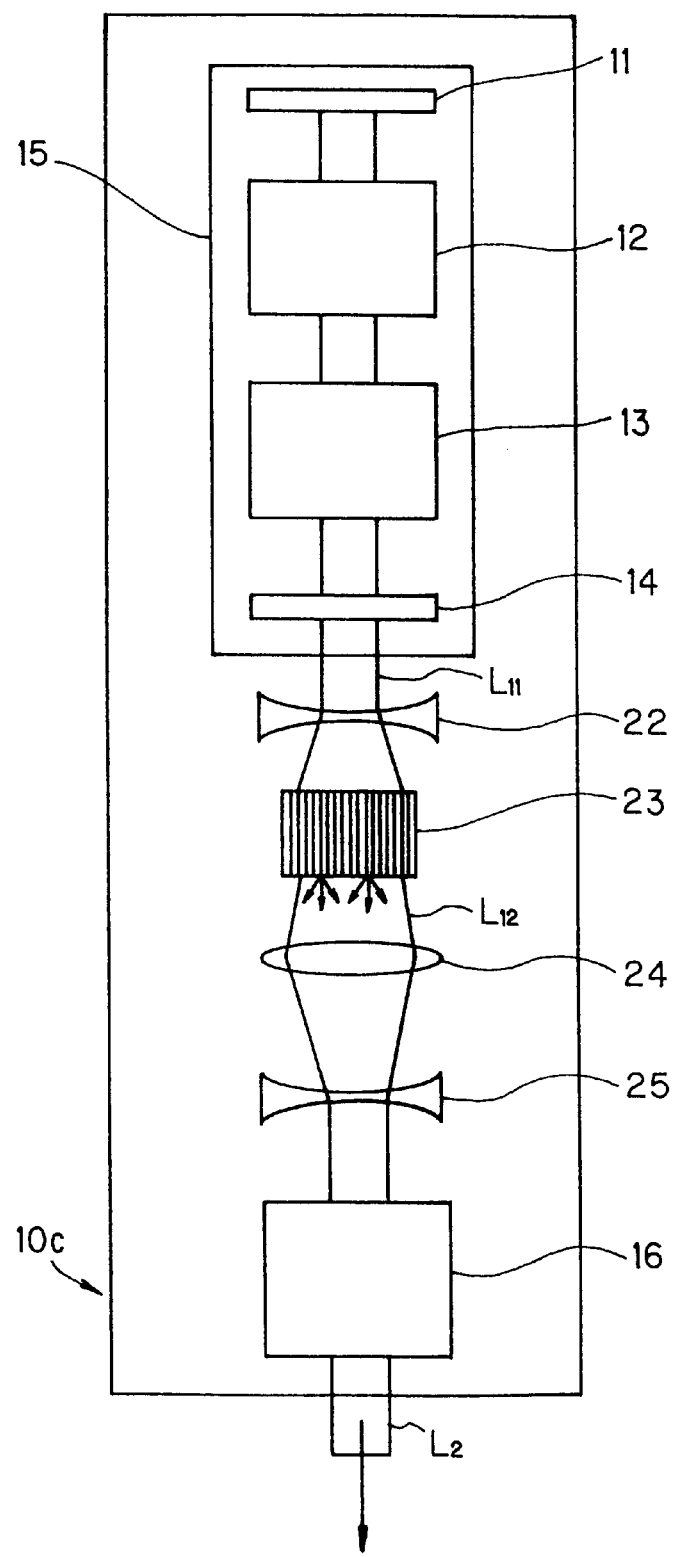
FIG. 3 is a view showing a structure of a pulse laser oscillator in a third embodiment according to the present invention.

Third Embodiment (FIG. 3)

Next, the third embodiment of the present invention will be described. FIG. 3 is a view showing a structure of a pulse laser oscillator unit in this embodiment.

This pulse laser oscillator unit 10c is a Q-switch type laser oscillator and comprises the same laser resonator 15 as that in the second embodiment, a first concave lens 22 for sequentially introducing pulse laser beams $L_{1\ 1}$ radiated from the laser resonator 15, an optical fiber plate (fiber optical plate, to be referred to as FOP hereinafter) 23, a condensing lens 24, a second concave lens 25 and a beam amplifier 16. The FOP 23 is an optical element having small cylindrical kaleidoscopes aligned on a plain in a pantoscopic arrangement. The laser beam is reflected, for example, once to ten times at each of the kaleidoscopes.

Next, the function of this Q-switch type laser oscillator unit 10c will be described. The laser resonator 15 radiates a pulse laser beam $L_{1\ 1}$ having a short time width and a high peak output rate with respect to an average output. The pulse laser beam $L_{1\ 1}$ is enlarged by the concave lens 22 to be matched with the aperture of the FOP 23 and introduced into the FOP 23 from one end thereof. The introduced laser beam $L_{1\ 1}$ is radiated while being reflected locally within the FOP 23 and radiated as a pulse laser beam $L_{1\ 2}$ having a certain spread angle from the other end of the FOP 23. The pulse laser beam $L_{1\ 2}$ radiated from the FOP 23 is converted into an almost parallel beam flux having a diameter matched with the aperture of the beam amplifier 16 by the condensing lens 24 and the concave lens 25.

It is, however, noted that the beam flux which has been locally, repeatedly reflected within the FOP 23, becomes a laser beam having low spatial coherence and a wide spread angle indicative of directivity unlike an ordinary laser beam. Furthermore, since locally, repeatedly reflected within the FOP 23, the spatial intensity distribution of the pulse laser beam $L_{1\ 2}$ is made uniform. The pulse laser beam $L_{1\ 2}$ is transmitted to the beam amplifier 16 and amplified into a pulse laser beam having very high peak output. Since the pulse laser beam $L_{1\ 1}$ before the amplification is appropriately diverged, the pulse laser beam $L_{1\ 2}$ after the amplification is also appropriately diverged. Further, since the intensity distribution of the pulse laser beam $L_{1\ 1}$ before the amplification is made uniform, the intensity distribution of the pulse laser beam $L_{1\ 2}$ after the amplification is also uniform. That is to say, the Q-switch type laser oscillator unit 10c radiates a pulse laser beam $L_2$ having a uniform spatial intensity distribution, a low spatial coherence and a wide spread angle indicative of directivity compared with an ordinary Q-switch type laser oscillator.

According to this embodiment, by inserting the FOP 23 between the laser resonator 15 and the beam amplifier 16, the Q-switch type laser oscillator unit 10c radiates a pulse laser beam $L_2$ having a uniform spatial intensity distribution, a low spatial coherence and a wide spread angle indicative of directivity. Such a pulse laser beam $L_2$ has high coherence, and the diameter of a condensed beam flux is large compared with an ordinary laser beam having a narrow spread angle indicative of directivity if each laser beam is condensed by using the same condensing optical system. That is to say, even if the pulse laser beam $L_2$ is introduced into a transmission optical fiber (optical fiber for beam transmission), the pulse laser beam $L_2$ is not converged finely within the optical fiber. Additionally, due to the fact that the spatial intensity distribution of the pulse laser beam $L_2$ is uniform, no local intensity peak appears at the optical fiber introduction portion. Thus, if this Q-switch type laser oscillator unit 10c is used as a beam source, a pulse laser beam having high peak output can be transmitted by the transmission optical fiber without damaging the optical fiber.

Figure 4:
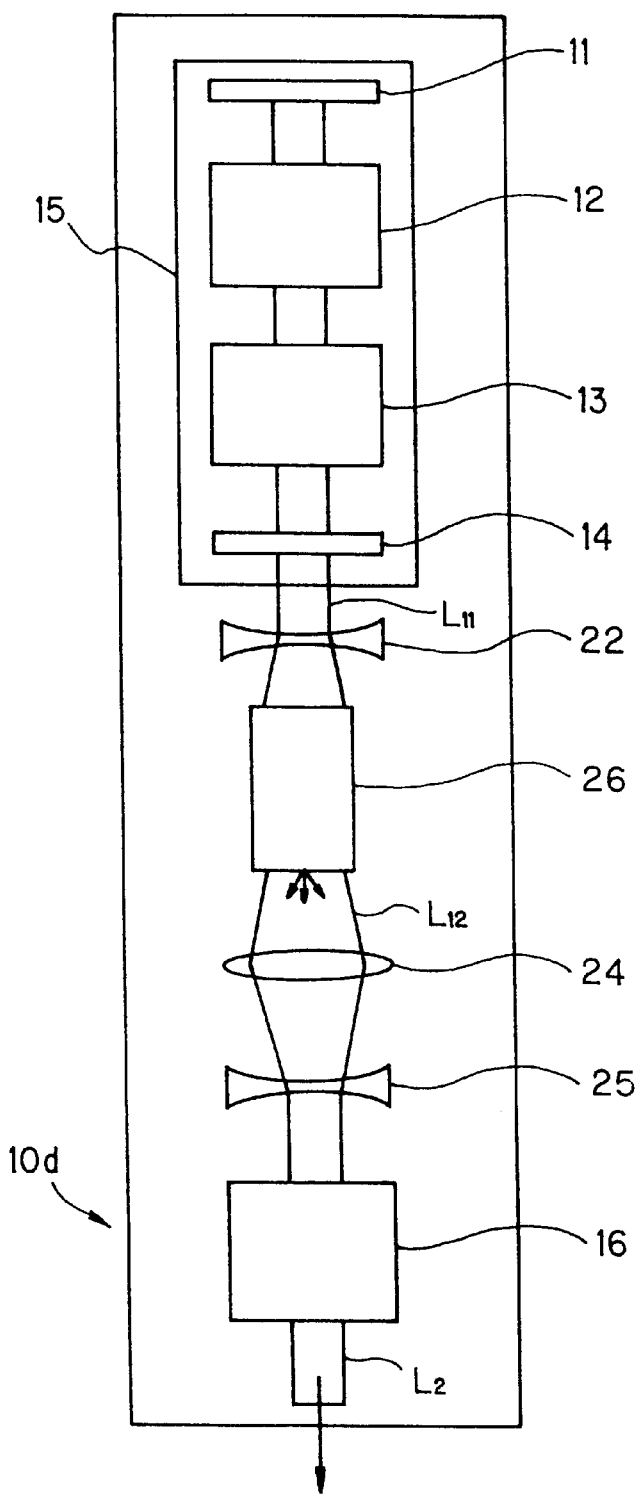
FIG. 4 is a view showing a structure of a pulse laser oscillator in a fourth embodiment according to the present invention.

Fourth Embodiment (FIG. 4)

FIG. 4 is a view showing a structure of a pulse laser oscillator unit in the fourth embodiment according to the present invention.

This pulse laser oscillator unit 10d is a Q-switch type laser oscillator and adopts one kaleidoscope 26 instead of the FOP 23 in the third embodiment. This kaleidoscope 26 is an optical element comprising a reflection mirror having a prismatic or cylindrical inner wall surface or the like. In this kaleidoscope 26, a laser beam is reflected, for example, one to ten times. The other constituent elements in FIG. 4 are denoted by the same reference numerals or symbols as those in FIG. 3 and the description thereto will not be given herein.

Next, the function of this Q-switch type laser oscillator unit 10d will be described. The laser resonator 15 radiates a pulse laser beam $L_{1\ 1}$ having a short time width and a high peak output rate with respect to an average output. The pulse laser beam $L_{1\ 1}$ is enlarged by a concave lens 22 to be matched with the aperture of the kaleidoscope 26 and introduced into the kaleidoscope 26 from one end thereof. The introduced pulse laser beam $L_{1\ 1}$ is transmitted while being reflected locally within the kaleidoscope 26 and radiated as a pulse laser beam $L_{1\ 2}$ having a certain spread angle from the other end of the kaleidoscope 26. The pulse laser beam $L_{1\ 2}$ radiated from the kaleidoscope 26 is converted into an almost parallel beam flux having a diameter matched with the aperture of a beam amplifier 16 by a condensing lens 24 and a concave lens 25.

It is noted, however, that this beam flux, which has been locally, repeatedly reflected within the kaleidoscope 26, becomes a laser beam having low spatial coherence and a wide spread angle indicative of directivity unlike an ordinary laser beam. Furthermore, since the pulse laser beam $L_{1\ 2}$ has been locally, repeatedly reflected within the kaleidoscope 26, the spatial intensity distribution of the pulse laser beam $L_{1\ 2}$ is made uniform. This pulse laser beam $L_{1\ 2}$ is transmitted to the beam amplifier 16 and amplified into a pulse laser beam having very high peak output. Since the pulse laser beam $L_{1\ 1}$ before the amplification is appropriately diverged, the pulse laser beam $L_{1\ 2}$ after the amplification is also appropriately diverged. Furthermore, since the pulse laser beam $L_{1\ 1}$ before the amplification has a uniform intensity distribution, the pulse laser beam $L_{1\ 2}$ after the amplification also has a uniform intensity distribution. That is to say, the Q-switch type laser oscillator unit 10d radiates a pulse laser beam $L_2$ having a uniform spatial intensity distribution, a low spatial coherence and a wide spread angle indicative of directivity compared with an ordinary Q-switch type laser oscillator.

According to this embodiment, by inserting the kaleidoscope 26 between the laser resonator 15 and the beam amplifier 16, the Q-switch type laser oscillator unit 10d radiates a pulse laser beam $L_2$ having a uniform spatial intensity distribution, a low spatial coherence and a wide spread angle indicative of directivity. Such a pulse laser beam $L_2$ has high spatial coherent and the diameter of a condensed beam flux is large compared with an ordinary laser beam having a narrow spread angle indicative of directivity if each laser beam is condensed by using the same condensing optical system. That is to say, even if this pulse laser beam $L_2$ is introduced into a transmission optical fiber, it is not converged finely within the optical fiber. Furthermore, since the intensity distribution of the pulse laser beam $L_2$ is uniform, no local intensity peak appears at the optical fiber introduction portion. Thus, if this Q-switch type laser oscillator unit 10d is used as a beam source, a pulse laser beam having high peak output can be transmitted by the transmission optical fiber without damaging the optical fiber.

Figure 5:
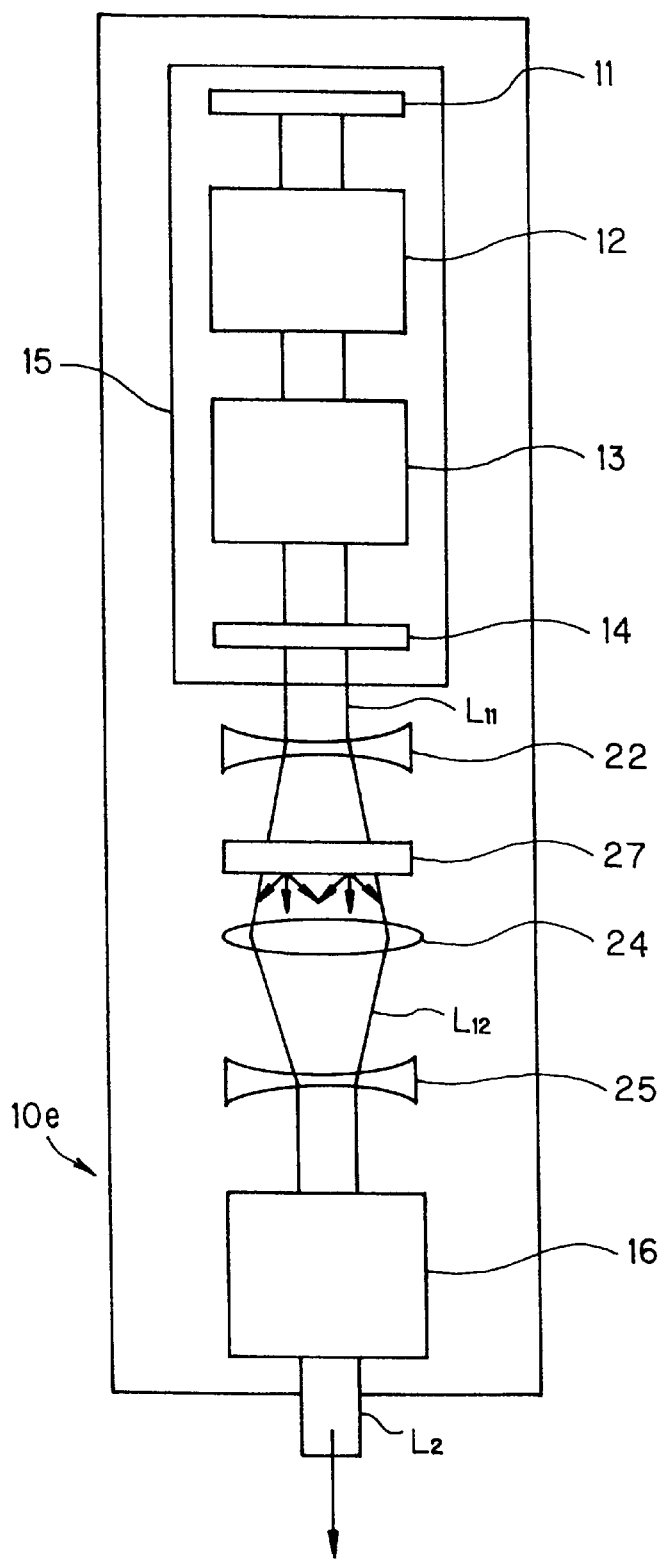
FIG. 5 is a view showing a structure of a pulse laser oscillator in a fifth embodiment according to the present invention.

Fifth Embodiment (FIG. 5)

FIG. 5 is a view showing a structure of a pulse laser oscillator unit in the fifth embodiment according to the present invention.

This pulse laser oscillator unit 10e is a Q-switch type laser oscillator and adopts a transmitting plate 27 for beam diffusion (diffusion beam transmitting plate 27) instead of the FOP 23 in the third embodiment. As the diffusion beam transmitting plate 27, an optical element such as, for example, an obscure glass having beam transmittance of 20 to 70% is applied and allows a laser beam having high directivity to be appropriately diffused.

Next, the function of this Q-switch type laser oscillator unit 10e will be described. A laser resonator 15 radiates a pulse laser beam $L_{1\ 1}$ having a short time width and a high peak output rate with respect to average output. This pulse laser beam $L_{1\ 1}$ is enlarged by a concave lens 22 to be matched with the aperture of the diffusion beam transmitting plate 27 and introduced into the diffusion beam transmitting plate 27 from one end thereof. The introduced pulse laser beam $L_{1\ 1}$ is transmitted while being locally, repeatedly reflected within the diffusion beam transmitting plate 27 and radiated as a pulse laser beam $L_{1\ 2}$ having a certain spread angle from the other end of the plate 27. The pulse laser beam $L_{1\ 2}$ radiated from the spread beam transmitting plate 27 is converted into an almost parallel beam flux having a diameter matched with the aperture of a beam amplifier 16 by a condensing lens 24 and a concave lens 25.

It is noted, however, that this beam flux, which has been locally, repeatedly reflected within the diffusion beam transmitting plate 27, becomes a laser beam having low spatial coherence and a wide spread angle indicative of directivity unlike an ordinary laser beam. Further, since the pulse laser $L_{1\ 2}$ is appropriately spread within the diffusion beam transmitting plate 27, the spatial intensity distribution of the pulse laser beam $L_{1\ 2}$ is made uniform. This pulse laser beam $L_{1\ 2}$ is transmitted to the beam amplifier 16 and amplified into a pulse laser beam having very high peak output. Since the pulse laser beam $L_{1\ 1}$ before the amplification is appropriately diverged, the pulse laser beam $L_{1\ 2}$ after the amplification is also appropriately diverged. Moreover, since the intensity distribution of the pulse laser beam $L_{1\ 1}$ before the amplification is made uniform, the pulse laser beam $L_{1\ 2}$ after the amplification also has a uniform intensity distribution. That is to say, the Q-switch type laser oscillator unit 10e radiates a pulse laser beam $L_2$ having a uniform spatial intensity distribution, low spatial coherence and a wide spread angle indicative of directivity compared with an ordinary Q-switch type laser oscillator.

According to this embodiment, by inserting the diffusion beam transmitting plate 27 between the laser resonator 15 and the beam amplifier 16, the Q-switch type laser oscillator unit 10e radiates a pulse laser beam $L_2$ having a uniform spatial intensity distribution, a low spatial coherence and a wide spread angle indicative of directivity. Such a pulse laser beam $L_2$ has high coherence and the diameter of a condensed beam flux is large compared with an ordinary laser beam having a narrow spread angle indicative of directivity if each laser beam is condensed using the same condensing optical system. That is to say, even if this pulse laser beam $L_2$ is introduced into a transmission optical fiber, it is not diverged finely within the optical fiber. Furthermore, since the intensity distribution of the pulse laser beam $L_2$ is uniform, no local intensity peak appears at the optical fiber introduction portion. Thus, if this Q-switch type laser oscillator unit 10e is used as a beam source, a pulse laser beam having high peak output can be transmitted by the transmission optical fiber without damaging the optical fiber.

Figure 6:
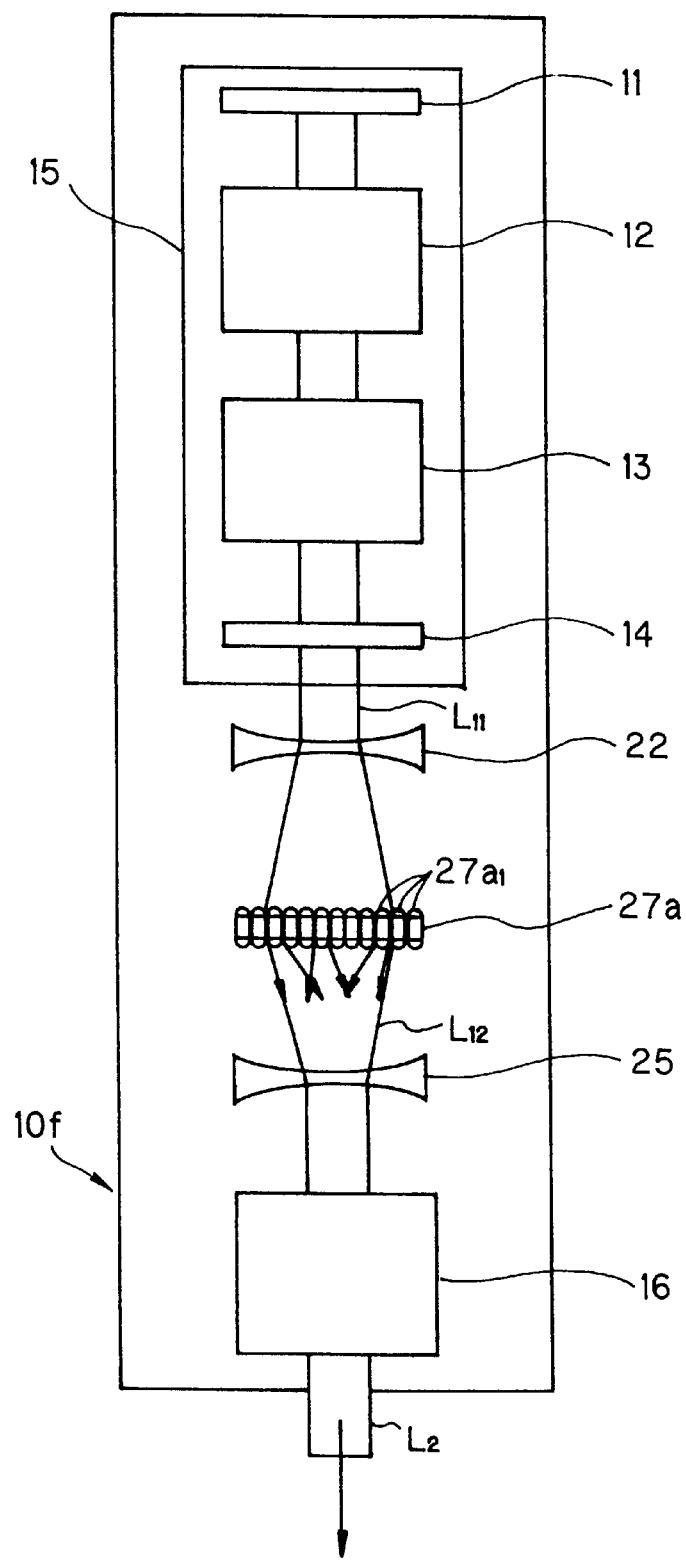
FIG. 6 is a view showing a structure of a pulse laser oscillator in a sixth embodiment according to the present invention.

Sixth Embodiment (FIG. 6)

FIG. 6 is a view showing a structure of a pulse laser oscillator unit in the sixth embodiment according to the present invention.

This pulse laser oscillator unit 10f is a Q-switch type laser oscillator and adopts a lens array, particularly of microlens array, 27a instead of the FOP 23 and the condensing lens 24 in the third embodiment. This microlens array 27a is an optical element having small condensing lenses $27a_1, \ldots$ obtained by dividing, for example, the condensing lens 24 shown in the third embodiment into 2 to 36 segments and aligned on a plane in a pantoscopic manner.

Next, the function of this Q-switch type laser oscillator unit 10f will be described. The laser resonator 15 radiates a pulse laser beam $L_{1\ 1}$ having a short time width and a high peak output rate with respect to the average output. This pulse laser beam $L_{1\ 1}$ is enlarged by a concave lens 22 to be matched with the aperture of the lens array 27a and introduced into the lens array 27a from one end thereof. The introduced pulse laser beam $L_{1\ 1}$ is transmitted while being locally reflected within the lens array 27a and radiated as a pulse laser beam $L_{1\ 2}$ having a certain spread angle from the other end of the lens array 27a. The pulse laser beam $L_{1\ 2}$ radiated from the microlens array 27a is converted into an almost parallel beam flux having a diameter matched with the aperture of a beam amplifier 16 by the condensing lens 24 and a concave lens 25.

It is noted, however, that this beam flux, which has been passed through the lens array 27a, becomes a laser beam having a low spatial coherence and a wide spread angle indicative of directivity unlike an ordinary laser beam. Furthermore, since the pulse laser beam $L_{1\ 2}$ has been locally, repeatedly reflected within the lens array 27a, the spatial intensity of the pulse laser beam $L_{1\ 2}$ is made uniform. This pulse laser beam $L_{1\ 2}$ is transmitted to the beam amplifier 16 and amplified into a pulse laser beam having very high peak output. Since the pulse laser beam $L_{1\ 1}$ before the amplification is appropriately diverged, the pulse laser beam $L_{1\ 2}$ after the amplification is also appropriately diverged. Moreover, since the intensity distribution of the pulse laser beam $L_{1\ 1}$ before the amplification is uniform, the pulse laser beam $L_{1\ 2}$ after the amplification also has a uniform intensity distribution. That is to say, this Q-switch type laser oscillator unit 10f radiates a pulse laser beam $L_2$ having a uniform spatial intensity distribution, a low spatial coherence and a wide spread angle indicative of directivity compared with an ordinary Q-switch type laser oscillator.

According to this embodiment, by inserting the lens (microlens) array 27a between the laser resonator 15 and the beam amplifier 16, the Q-switch type laser oscillator 10f radiates a pulse laser beam $L_2$ having a uniform spatial intensity distribution, a low spatial coherence, and a wide spread angle indicative of the directivity. Such a pulse laser beam $L_2$ has high spatial coherence and the diameter of a condensed beam flux is large compared with an ordinary laser beam having a narrow spread angle indicative of directivity if each laser beam is condensed by using the same condensing optical system. That is to say, even if this pulse laser beam $L_2$ is introduced into a transmission optical fiber, it is not converged finely within the optical fiber. Furthermore, since the spatial intensity distribution of the pulse laser beam $L_2$ is uniform, no local intensity peak appears at the optical fiber introduction portion. Thus, if this Q-switch type laser oscillator unit 10f is used as a beam source, a pulse laser beam having high peak output can be transmitted by the transmission optical fiber without damaging the optical fiber.

Figure 7:
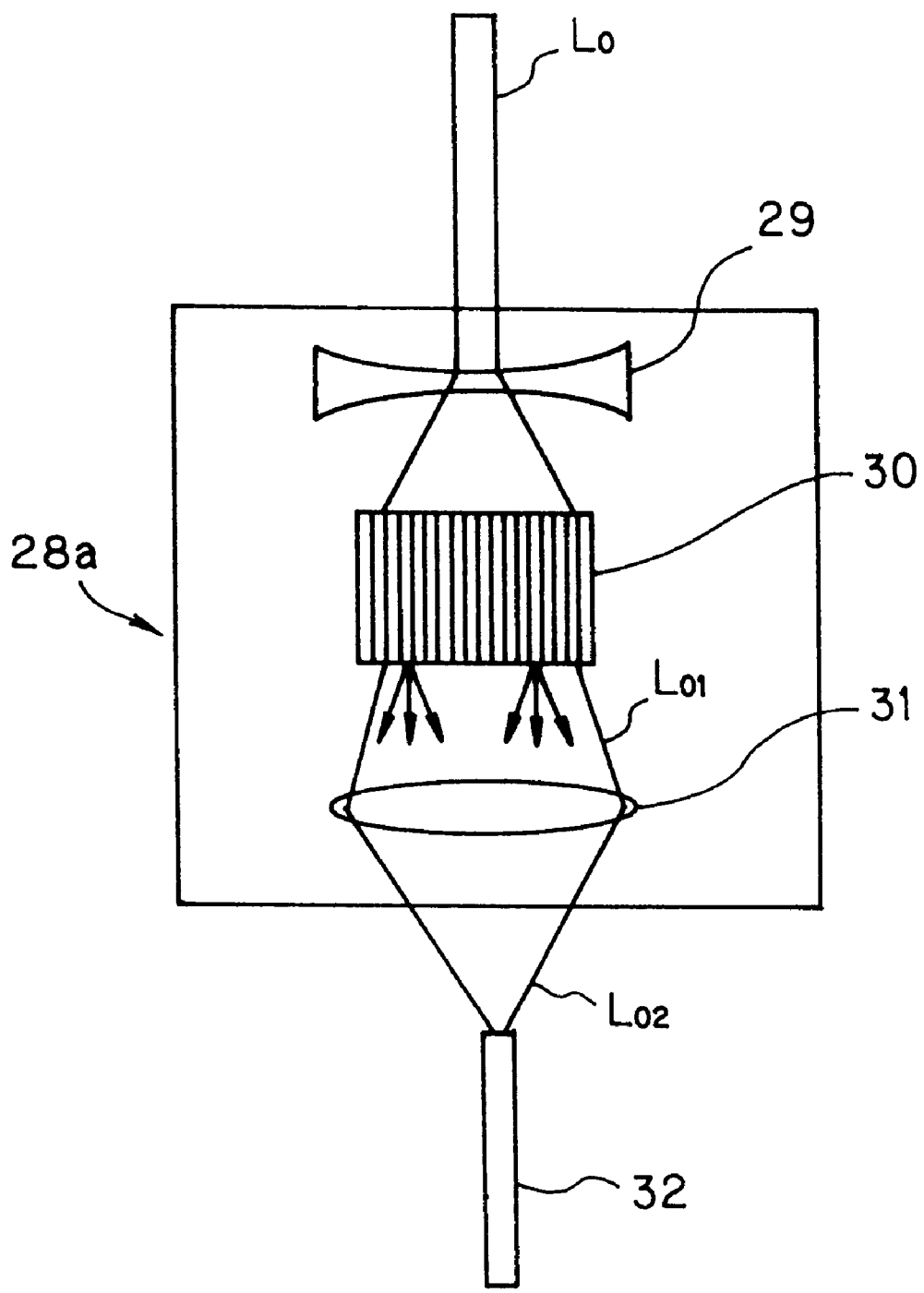
FIG. 7 is a view showing a structure of a beam guide device in a seventh embodiment according to the present invention.

Seventh Embodiment (FIG. 7)

FIG. 7 is a view showing a structure of a beam guide device or unit in the seventh embodiment according to the present invention.

A beam guide device or unit of the embodiments mentioned herein through which the laser beam is guided to an optical fiber may be mentioned hereunder as a pulse laser beam guide device or mere a beam guide device.

This beam guide device 28a is, for example, an optical fiber beam guide device for introducing a pulse laser beam $L_0$ from an ordinary pulse laser oscillator to a transmission optical fiber 32. This device 28a has a structure in which a concave lens 29 and an FOP 30 are arranged in this order along the direction in which a pulse laser beam L is passed through and a condensing lens 31 serving as a condensing optical system condensing a pulse laser beam $L_{0\ 1}$ radiated from the FOP 30 is provided.

A pulse laser beam $L_0$ incident on the beam guide device 28a is a pulse laser beam having a high peak output or a pulse laser beam generated from, for example, a Q-switch type YAG laser oscillator or the second higher harmonics thereof. The FOP 30 is an optical element having small cylindrical kaleidoscopes aligned on a plain in a pantoscopic manner almost as in the case of the FOP mentioned hereinabove.

Next, the function of the beam guide device 28a will be described. A pulse laser beam $L_0$ having high peak output is enlarged by a concave lens 29 to be matched with the aperture of the FOP 30 and introduced into the FOP 30 from one end thereof. The pulse laser beam $L_0$ is transmitted while being locally reflected within the FOP 30 and radiated as a pulse laser beam $L_{0\ 1}$ having a certain spread angle from the other end of the FOP 30. The pulse laser beam $L_{0\ 1}$ radiated from the FOP 30, which has been locally, repeatedly reflected within the FOP 30, has a low spatial coherence. Furthermore, the pules laser beam $L_{0\ 1}$, which has been locally, repeatedly reflected within the FOP 30, has a uniform spatial intensity distribution. The pulse laser beam $L_{0\ 1}$ radiated from the FOP 30 is condensed by a condensing lens 31. This condensed pulse laser beam $L_{0\ 2}$ is introduced into a transmission optical fiber 32. The pulse laser beam $L_{0\ 2}$ introduced into the transmission optical fiber 32 is reflected on the interface between a concave core and a clad and converged. Since the pulse laser beam has a low spatial coherence and has a uniform spatial intensity distribution, no local intensity peak appears at the introduction portion of the transmission optical fiber 32.

According to this embodiment, the pulse laser beam $L_0$ having high spatial coherence is introduced into the transmission optical fiber 32 after being passed through the FOP 30 to thereby reduce the spatial coherence. Owing to this matter, the introduced pulse laser beam $L_{0\ 2}$ is not converged finely within the transmission optical fiber 32 and the fiber 32 is not damaged. Furthermore, since the pulse laser beam $L_{0\ 2}$ is introduced into the transmission optical fiber 32 after being passed through the FOP 30 to thereby make the spatial intensity distribution thereof uniform, the pulse laser beam $L_{0\ 2}$ does not have a local intensity peak at the introduction portion of the transmission optical fiber 32 and the transmission optical fiber is not, therefore, damaged. Thus, if this beam guide device 28a is used, a pulse laser beam having a high peak output can be transmitted by the transmission optical fiber without damaging the optical fiber.

Figure 8:
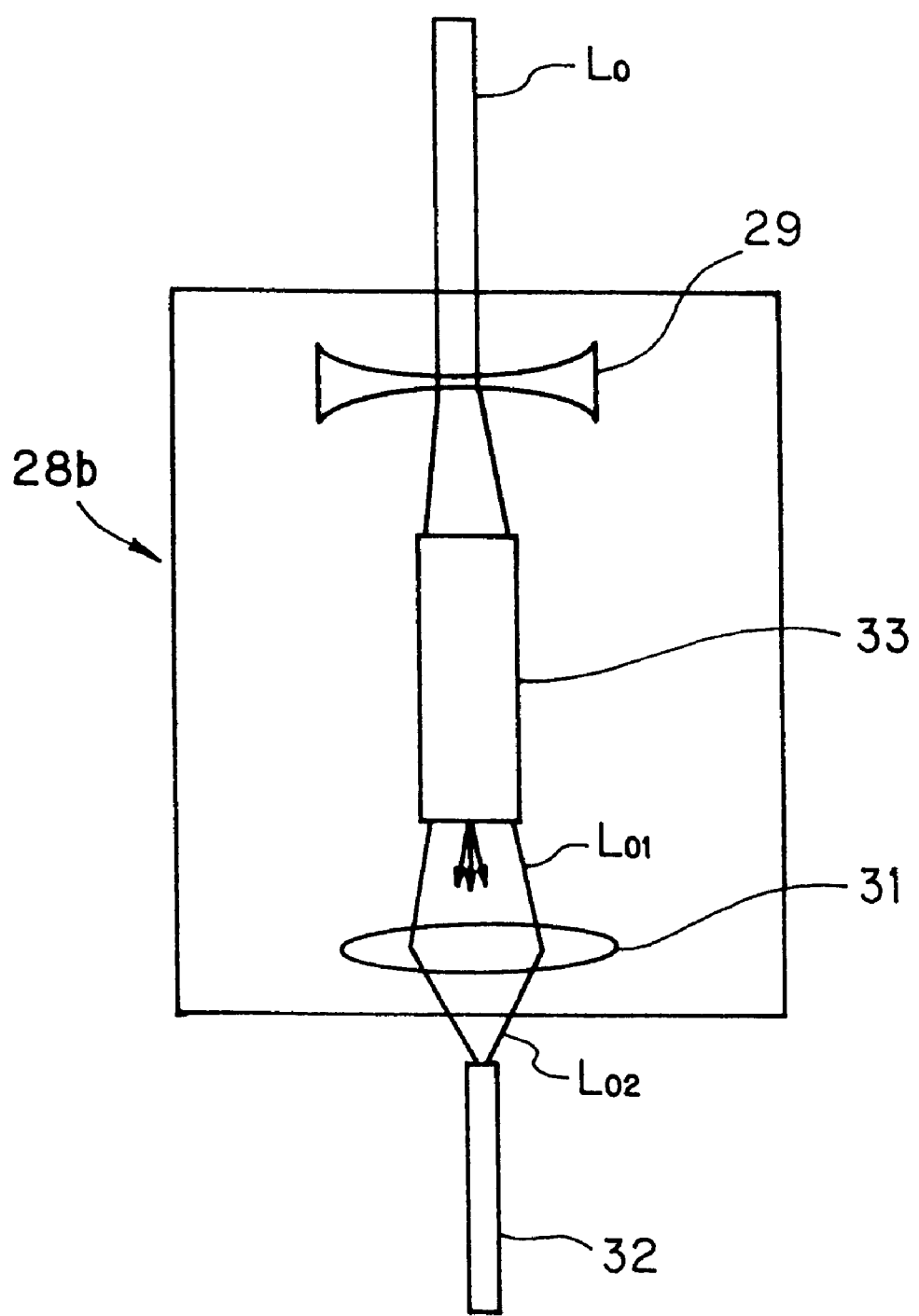
FIG. 8 is a view showing a structure of a beam guide device in an eighth embodiment according to the present invention.

Eighth Embodiment (FIG. 8)

FIG. 8 is a view showing a structure of a pulse laser beam guide device or unit in the eighth embodiment according to the present invention.

This beam guide device 28b adopts a kaleidoscope 33 instead of the FOP 30 in the seventh embodiment. This kaleidoscope 33 is an optical element comprising a reflection mirror having a prismatic or cylindrical inner wall surface as in the case of the kaleidoscope described above. The other constituent elements shown in FIG. 8 are denoted by the same reference numerals as those in the seventh embodiment shown in FIG. 7 and the description thereto will not be given herein.

Next, the function of this pulse laser beam guide device 28b will be described. A pulse laser beam $L_0$ having high peak output is enlarged by a concave lens 29 to be matched with the aperture of the kaleidoscope 33 and introduced into the kaleidoscope 33 from one end thereof. The pulse laser beam $L_0$ is transmitted while being locally reflected within the kaleidoscope 33 and radiated as a pulse laser beam $L_{0\ 1}$ having a certain spread angle from the other end of the kaleidoscope 33. The pulse laser beam $L_{0\ 1}$ radiated from the kaleidoscope 33, which has been locally, repeatedly reflected within the kaleidoscope 33, has a lower spatial coherence. Furthermore, the pulse laser beam $L_{0\ 1}$, which has been locally, repeatedly reflected within the kaleidoscope 33, has a uniform spatial intensity distribution. The pulse laser beam $L_{0\ 1}$ radiated from the kaleidoscope 33 is condensed by a condensing lens 31 and the condensed pulse laser beam $L_{0\ 2}$ is introduced into a transmission optical fiber 32. The pulse laser beam $L_{0\ 2}$ introduced into the transmission optical fiber 32 is reflected and converged on the interface between a concave core and a clad. However, due to the low spatial coherence, the pulse laser beam $L_{0\ 2}$ is not converged finely unlike an ordinary laser beam having high spatial coherence. Furthermore, due to the uniform spatial intensity distribution, the pulse laser beam $L_{0\ 2}$ does not have a local intensity peak at the introduction portion of the transmission optical fiber 32.

According to this embodiment, the pulse laser beam $L_0$ having high spatial coherence is introduced into the transmission optical fiber 32 after being passed through the kaleidoscope 33 to thereby reduce the coherence thereof. Accordingly, the introduced pulse laser beam $L_{0\ 2}$ is not converged finely within the transmission optical fiber 32 and the optical fiber 32 is not, therefore, damaged. Additionally, since the pulse laser beam $L_{0\ 2}$ is introduced into the transmission optical fiber 32 after being passed through the kaleidoscope 33 to thereby make the spatial intensity distribution thereof uniform, the pulse laser beam $L_{0\ 2}$ does not have a local intensity peak at the introduction portion of the transmission optical fiber 32 and the optical fiber 32 is not, therefore, damaged. Thus, if this beam guide device 28b is used, a pulse laser beam having high peak output can be transmitted by the transmission optical fiber without damaging the optical fiber.

Figure 9:
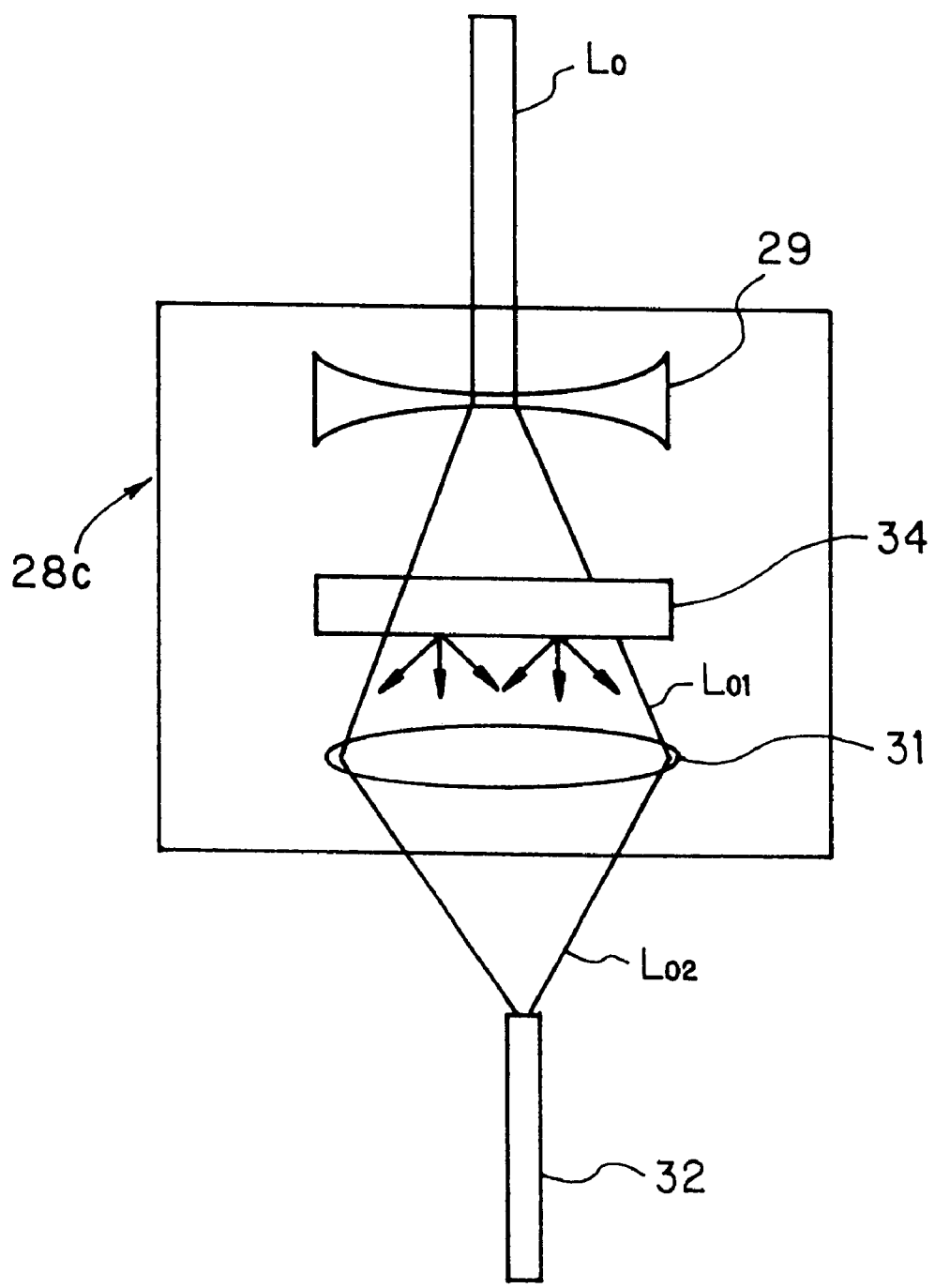
FIG. 9 is a view showing a structure of a beam guide device in a ninth embodiment according to the present invention.

Ninth Embodiment (FIG. 9)

FIG. 9 is a view showing a structure of a beam guide device or unit in the ninth embodiment according to the present invention.

This pulse laser beam guide device 28c adopts a transmitting plate 34 for beam diffusion (diffusion beam transmitting plate 34) instead of the FOP 30 in the seventh embodiment. An optical element such as an obscure glass is applied to this diffusion beam transmitting plate 34 as in the case of the transmitting plate mentioned before and allows a pules laser beam having high directivity to be appropriately spread. The other elements shown in FIG. 9 will be denoted by the same reference numerals as those in the seventh embodiment shown in FIG. 7 and the description thereto will not be given herein.

Next, the function of this pulse laser beam guide device 28c will be described. A pulse laser beam $L_0$ having high peak output is enlarged by a concave lens 29 to be matched with the aperture of the diffusion beam transmitting plate 34 and introduced into the diffusion beam transmitting plate 34 from one end thereof. The pulse laser beam $L_0$ is transmitted while being locally reflected within the diffusion beam transmitting plate 34 and radiated as a pulse laser beam $L_{0\ 1}$ having a certain spread angle from the other end of the plate 34. Since the pulse laser beam $L_{0\ 1}$ radiated from the diffusion beam transmitting plate 34 has been appropriately spread within the plate 34, the spatial coherence of the laser beam $L_{0\ 1}$ becomes lower. Furthermore, since the pulse laser beam $L_{0\ 1}$ has been locally, repeatedly reflected within the diffusion beam transmitting plate 34, the spatial intensity distribution of the beam $L_{0\ 1}$ is made uniform. The pulse laser beam $L_{0\ 1}$ radiated from the diffusion beam transmitting plate 34 is condensed by a condensing lens 31, and the condensed pulse laser beam $L_{0\ 2}$ is introduced into a transmission optical fiber 32. The pulse laser beam $L_{0\ 2}$ introduced into the transmission optical fiber 32 is reflected and converged on the interface between a concave core and a clad. However, due to the low spatial coherence, the pulse laser beam $L_{0\ 2}$ is not converged finely unlike an ordinary laser beam having a high spatial coherence. Furthermore, due to the uniform spatial intensity distribution, the pulse laser beam $L_{0\ 2}$ does not have a local intensity peak at the introduction portion of the optical fiber 32.

According to this embodiment, the pules laser beam $L_0$ having high spatial coherence is introduced into the transmission optical fiber 32 after being passed through the diffusion beam transmitting plate 34 to thereby reduce the spatial coherence thereof. Owing to this matter, the introduced pulse laser beam $L_{0\ 2}$ is not converged finely within the transmission optical fiber 32, and the optical fiber 32 is not, therefore, damaged. Furthermore, since the laser beam $L_{0\ 2}$ is introduced into the transmission optical fiber 32 after being passed through the diffusion beam transmitting plate 34 to thereby make the spatial intensity distribution uniform, the pulse laser beam $L_{0\ 2}$ does not have a local intensity peak at the introduction portion of the transmission optical fiber 32, and the optical fiber 32 is not, therefore, damaged. Thus, if the beam guide device 28c is used, a pulse laser beam having high peak output can be transmitted by the optical fiber without damaging the optical fiber.

Tenth Embodiment (FIG. 10)

Figure 10A:
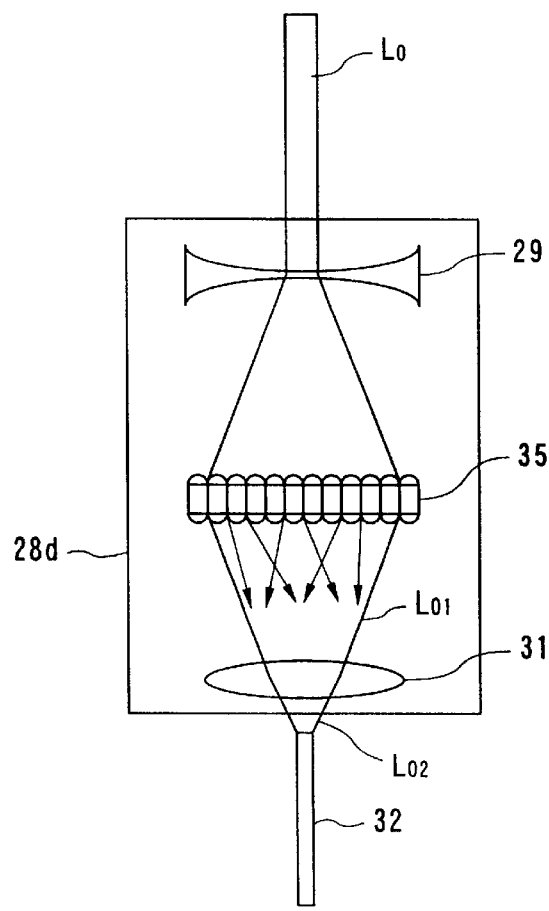
FIG. 10A is a view showing a structure of a beam guide device in a tenth embodiment according to the present invention, and FIGS. 10B(*a*), (*b*) and (*c*) are views showing laser beam distribution for explaining the embodiment of the present invention.
Figure 10B:
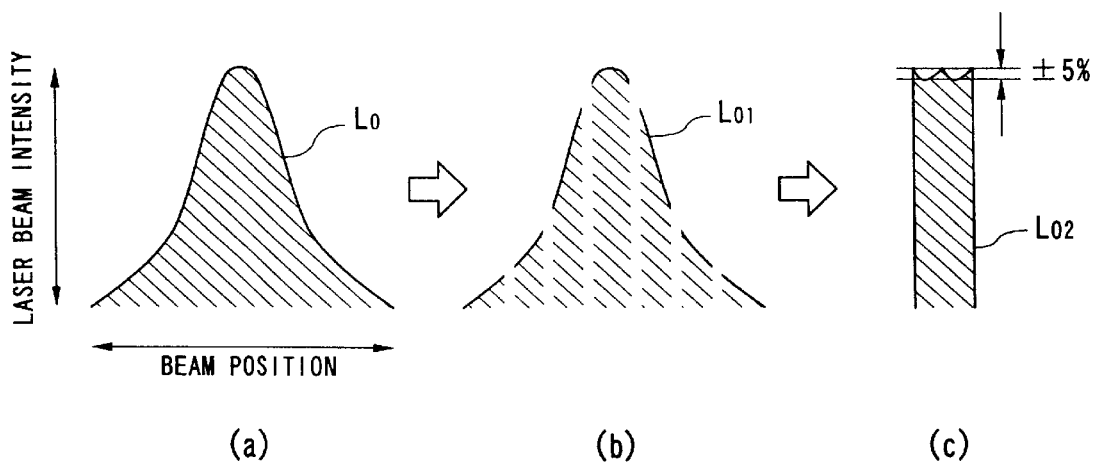

FIG. 10A is a view showing a structure of a beam guide device or unit in the tenth embodiment of the beam transmission system according to the present invention, and FIG. 10B is a view showing a function of the optical fiber beam guide device.

This beam guide device 28d adopts a lens array, particularly of microlens array, 35 instead of the FOP in the seventh embodiment. This microlens array 35 is an optical element having small condensing lenses aligned on a plane in a pantoscopic manner as in the case of the microlens array mentioned above. The other elements shown in FIG. 10 are denoted by the same reference numerals as those in the seventh embodiment shown in FIG. 7 and the description thereto will not be given herein.

Next, the function of this pulse laser beam guide device 28d will be described. A pulse laser beam $L_0$ having a high peak output is enlarged by a concave lens 29 to be matched with the aperture of the lens array 35 and introduced into the lens array 35 from one end thereof. The pulse laser beam $L_0$ is transmitted while being locally reflected within the lens array 35 and radiated as a pulse laser beam $L_{0\ 1}$ having a certain spread angle from the other end of the array 35. Since the pulse laser beam $L_{0\ 1}$ radiated from the lens array 35 has been appropriately spread within the lens array 35, the spatial coherence thereof is lowered. Furthermore, since the pulse laser beam $L_{0\ 1}$ has been passed through the lens array 35, the spatial intensity distribution thereof is made uniform. The pulse laser beam $L_{0\ 1}$ radiated from the lens array 35 is condensed by a condensing lens 31 and the condensed pulse laser beam $L_{0\ 2}$ is introduced into a transmission optical fiber 32. The pulse laser beam $L_{0\ 2}$ introduced into the transmission optical fiber 32 is reflected and converged on the interface between a concave core and a clad. However, due to the low spatial coherence, the pulse laser beam $L_{0\ 2}$ is not converged finely unlike an ordinary laser beam. Further, due to the uniform spatial intensity distribution, the pulse laser beam $L_{0\ 2}$ does not have a local intensity peak at the introduction portion of the transmission optical fiber 32.

According to this embodiment, the pules laser beam $L_0$ having high spatial coherence is introduced into the transmission optical fiber 32 after being passed through the lens array 35 to thereby reduce the spatial coherence. Accordingly, the introduced pulse laser beam $L_{0\ 2}$ is not converged finely within the transmission optical fiber 32 and the optical fiber 32 is not, therefore, damaged. Further, since the pulse laser beam $L_{0\ 2}$ is introduced into the transmission optical fiber 32 after being passed through the lens array 35 to thereby make the spatial intensity distribution thereof uniform, the pulse laser beam $L_{0\ 2}$ does not have a local intensity peak at the introduction portion of the transmission optical fiber 32 and the transmission optical fiber 32 is not, therefore, damaged. Thus, if this beam guide device 28d is used, a pulse laser beam having a high peak output can be transmitted by the transmission optical fiber without damaging the optical fiber.

FIG. 10B includes three views (a), (b) and (c) two-dimensionally representing spatial intensity distribution of the pulse laser beams $L_0$, $L_1$ and $L_2$. The intensity of the pulse laser beam $L_0$ before the incidence into the lens array 35 has a distribution in which the central portion has high intensity which is weakened as being apart therefrom, so-called mount-shape distribution. When such laser beam is condensed by means of the condensing lens 31, the laser beam is condensed on one small point because of its high coherence. Since the lens array 35 is composed of divided small lenses, the laser beams $L_{0\ 1}$ passing through the respective lenses of the lens array 35 are condensed respectively on different points and not on one point. Furthermore, at the entrance portion of the optical fiber 32, the divided laser beams through the lens array 35 are overlapped and projected as the pulse laser beam $L_{0\ 2}$, so that the spatial intensity distribution is made uniform. With the beam guide device 28d of the present embodiment, the spatial intensity distribution is adjusted to be ±5% with respect to the average intensity. Although it is desirable for the dispersion of the intensity to be as small as possible, in order to satisfy this requirement, it is necessary to increase the number of the divided small lenses, which results in manufacturing cost increasing. The inventors of the subject application has been considered various factors including the above matter and concluded that the distribution range of "±5%" is satisfactorily suitable for practical use.

Further, it is to be noted that the above description made with reference to FIG. 10B is applicable to other embodiment utilizing the lens array such as that shown in FIG. 6, and moreover, will be similarly applicable to the other embodiments using the elements or units other than the beam guide device with respect to the coherence reduction function.

Eleventh Embodiment (FIG. 11)

Figure 11A:
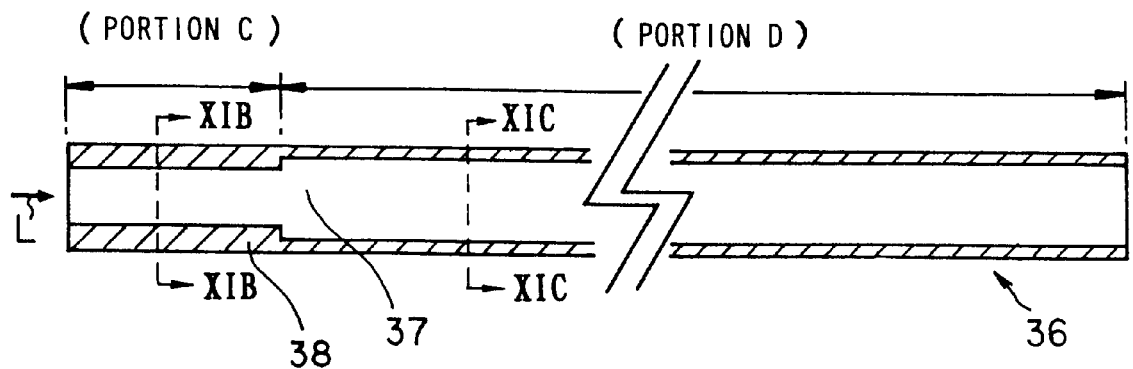
FIG. 11A is a cross-sectional view showing a beam guide device in an eleventh embodiment according to the present invention.
Figure 11B:
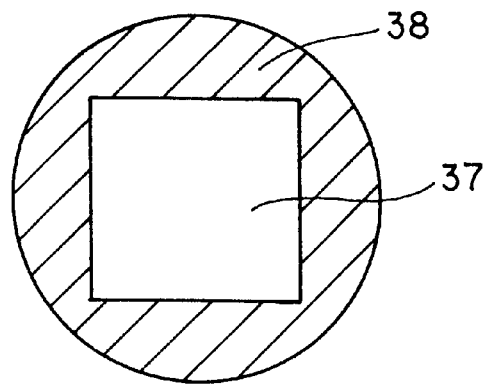
FIGS. 11B and 11C are cross-sectional views taken along lines XIB—XIB and XIC—XIC in FIG. 11A, respectively.
Figure 11C:
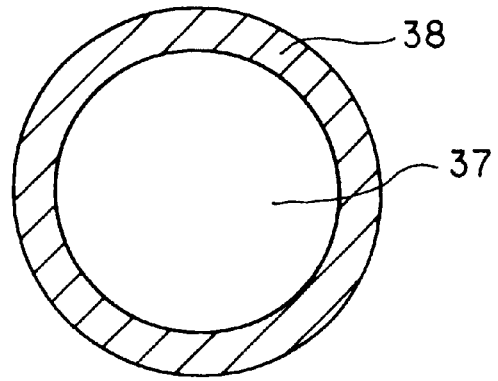

Next, the first embodiment according to the present invention will be described. FIG. 11A is a cross-sectional view showing an overall transmission optical fiber (beam transmission type optical fiber unit) in this embodiment and FIGS. 11B and 11C are cross sectional views taken along lines X—X and Y—Y of FIG. 11(a), respectively.

This transmission optical fiber 36 is formed out of a core 37 serving as a core portion and a clad 38 covering the core. Material such as quartz is used for the core 37 and the refraction index distribution is step index type or the like. The core 37 of this transmission optical fiber 36 has a prismatic fixed length portion on one end (C portion) and cylindrical other portions (D portion).

The function of this transmission optical fiber 36 will be described. If a pulse laser beam L having a high peak output is condensed through an ordinary pulse laser oscillator (not shown) and is introduced into the transmission optical fiber 36 from the one end side at which the core 37 is prism-shaped, the pulse laser beam L is reflected on the interface between the outer peripheral surface of the prismatic core 37 and the clad 38 surrounding the core 37. This interface is prism-shaped and constituted to be planar. According to this matter, a reflection beam is diverged and not converged finely. Then, the pulse laser beam L is transmitted while being repeatedly reflected within the prismatic core 37 and reaches the interior of the cylindrical core 37. It is noted, however, that the pulse laser beam L has been repeatedly reflected within the prismatic core and the spatial coherence thereof is, therefore, reduced.

Next, the pulse laser beam L is reflected and converged because the interface between the outer peripheral surface of the core 37 and the surrounding clad 38 is a concave finished mirror having a circular arc surface. However, due to the low spatial coherence, the laser beam L is not converged finely unlike an ordinary laser beam having high spatial coherence.

According to this embodiment, the end portion of the core 37 of the transmission optical fiber 36 is prism-shaped. Due to this matter, even if the pulse laser beam L is guided to the transmission optical fiber 36, the pulse laser beam L is not converged finely within the transmission optical fiber 36 and the optical fiber is not, therefore, damaged. Thus, if this transmission optical fiber 36 is used, a laser beam having high peak output can be transmitted by the optical fiber without damaging the optical fiber itself.

Figure 12:
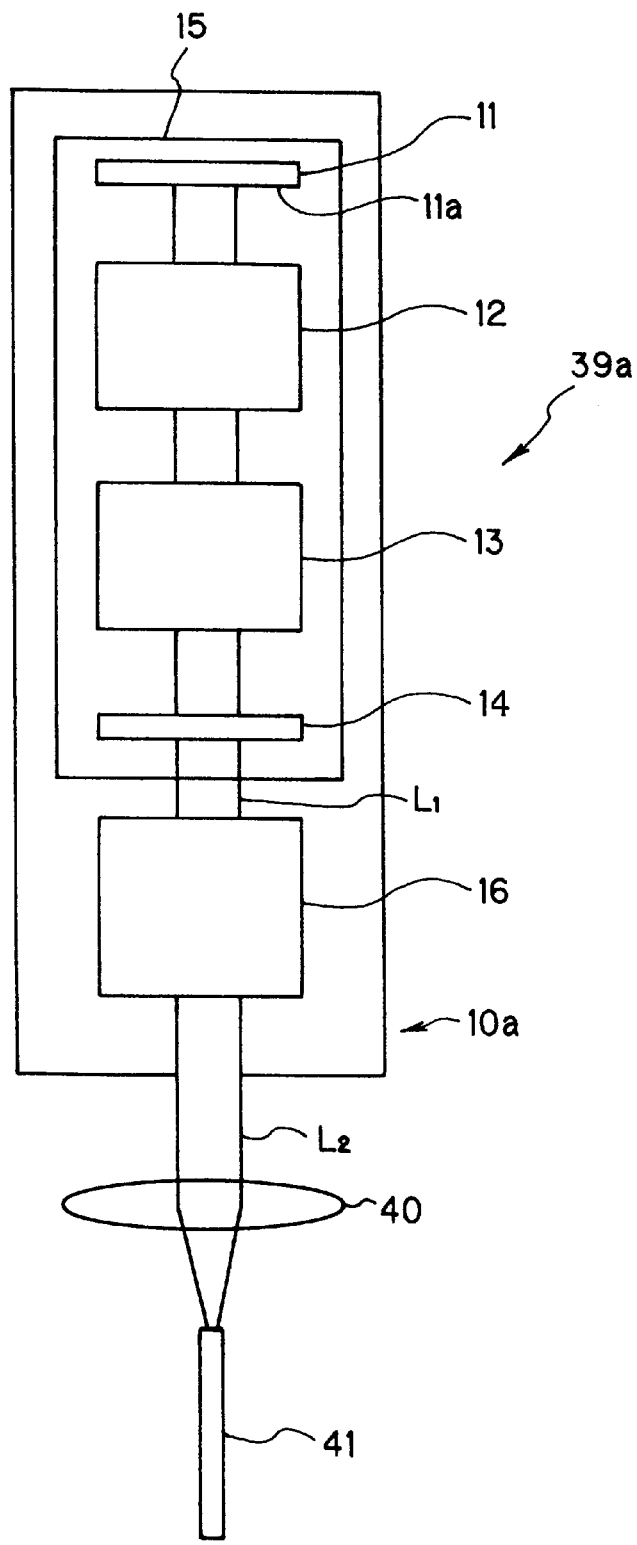
FIG. 12 is a view showing a structure of an optical fiber transmission type laser system in a twelfth embodiment according to the present invention.

Twelfth Embodiment (FIG. 12)

Next, the twelfth embodiment according to the present invention will be described.

FIG. 12 is a view showing a structure of an optical fiber transmission type laser system in this embodiment.

This optical fiber transmission type laser system 39a comprises a pulse laser oscillator unit 10a shown in the first embodiment, a condensing lens 40 serving as a condensing optical device condensing a pulse laser beam $L_2$ from the pulse laser oscillator unit 10a and an optical fiber 41 for transmitting the condensed pulse laser beam $L_2$. As the transmission optical fiber 41, an optical fiber of, for example, step index type having a quartz core is used.

In the optical fiber transmission type laser system constituted as stated above, a pulse laser beam $L_2$ of a high peak output having low spatial coherence and a wide spread angle indicative of directivity is radiated from the pulse laser oscillator unit 10a by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has a low spatial coherence, is not converged finely.

According to this embodiment, the pulse laser oscillator unit 10a wherein the surface 11a of the rear mirror 11 of the laser resonator 15 is formed into a sand finished surface, is used as a beam source. Owing to this matter, the pulse laser beam $L_2$ is not converged finely within the transmission optical fiber 41 and the optical fiber is not, therefore, damaged. Thus, if this optical fiber type laser system 39a is used, a pulse laser beam having a high peak output can be transmitted by the transmission optical fiber 41 without damaging the transmission optical fiber 41.

Figure 13:
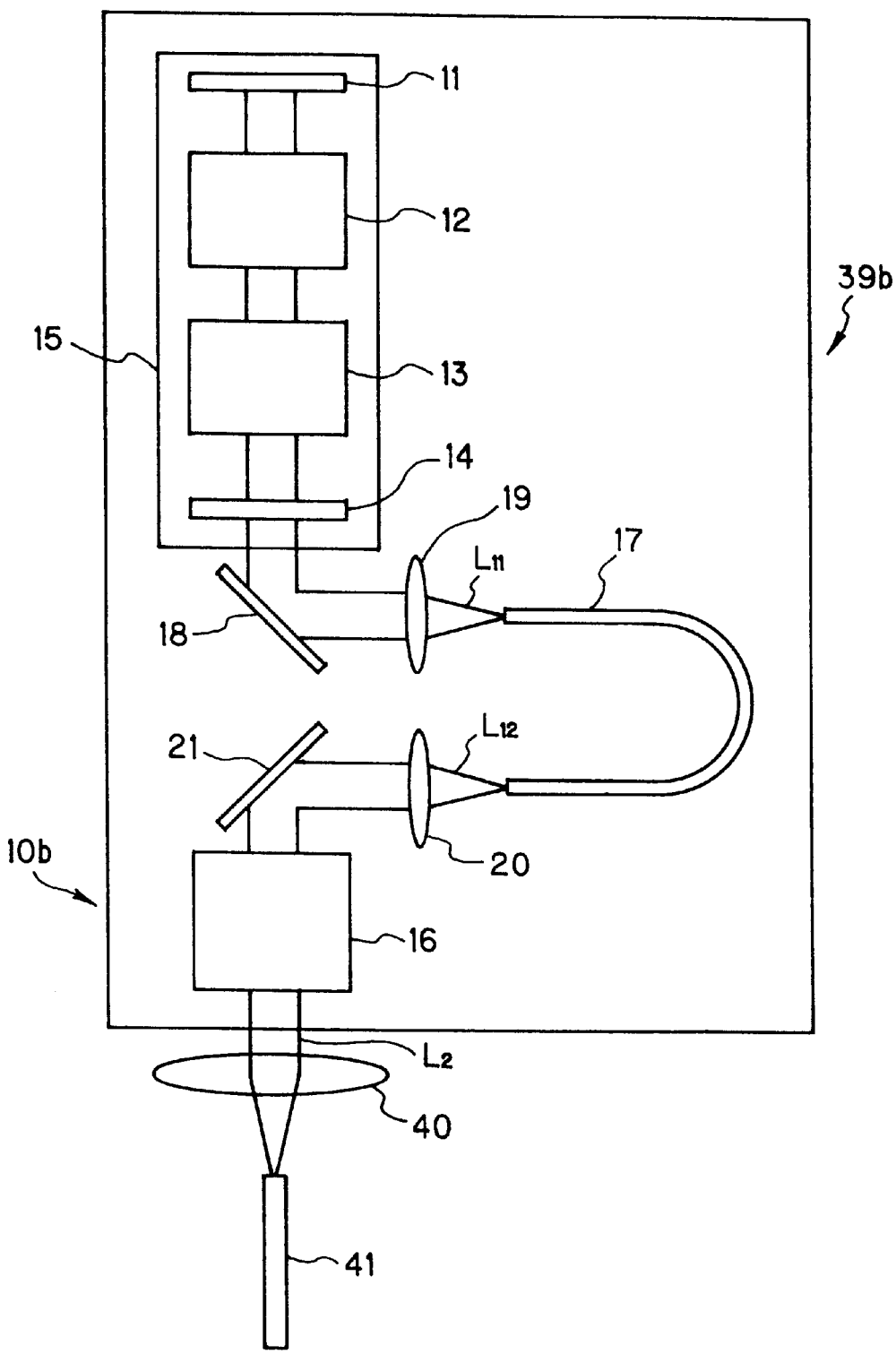
FIG. 13 is a view showing a structure of an optical fiber transmission type laser system in a thirteenth embodiment according to the present invention.

Thirteenth Embodiment (FIG. 13)

FIG. 13 is a view showing a structure of an optical fiber transmission type laser system in the thirteenth embodiment according to the present invention.

This optical fiber transmission type laser system 39b comprises a pulse laser oscillator unit 10b shown in the second embodiment, a condensing lens 40 serving as a condensing optical device condensing a pulse laser beam $L_2$ from the pulse laser oscillator unit 10b and an optical fiber 41 for transmitting the condensed pulse laser beam $L_2$. As the transmission optical pulse 41, an optical fiber of, for example, step index type having a quartz core is used.

In the optical fiber transmission type laser system constituted as stated above, a pulse laser beam $L_2$ of the high peak output, a low spatial coherence and a wide spread angle indicative of directivity is radiated from the pulse laser oscillator unit 10b by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has a low spatial coherence, is not converged finely. In addition, due to the uniform spatial intensity distribution, the pulse laser beam $L_2$ does not have a local intensity peak at the introduction portion of the transmission optical fiber 41.

In this embodiment, too, the pulse laser beam $L_2$ is not converged finely within the transmission optical fiber 41 and does not have a local intensity peak at the introduction portion of the transmission optical fiber 41, and the optical fiber is not damaged. Accordingly, if this optical fiber type laser system 39b is used, a pulse laser beam having the high peak output can be transmitted by the transmission optical fiber 41 without damaging the optical fiber 41.

Figure 14:
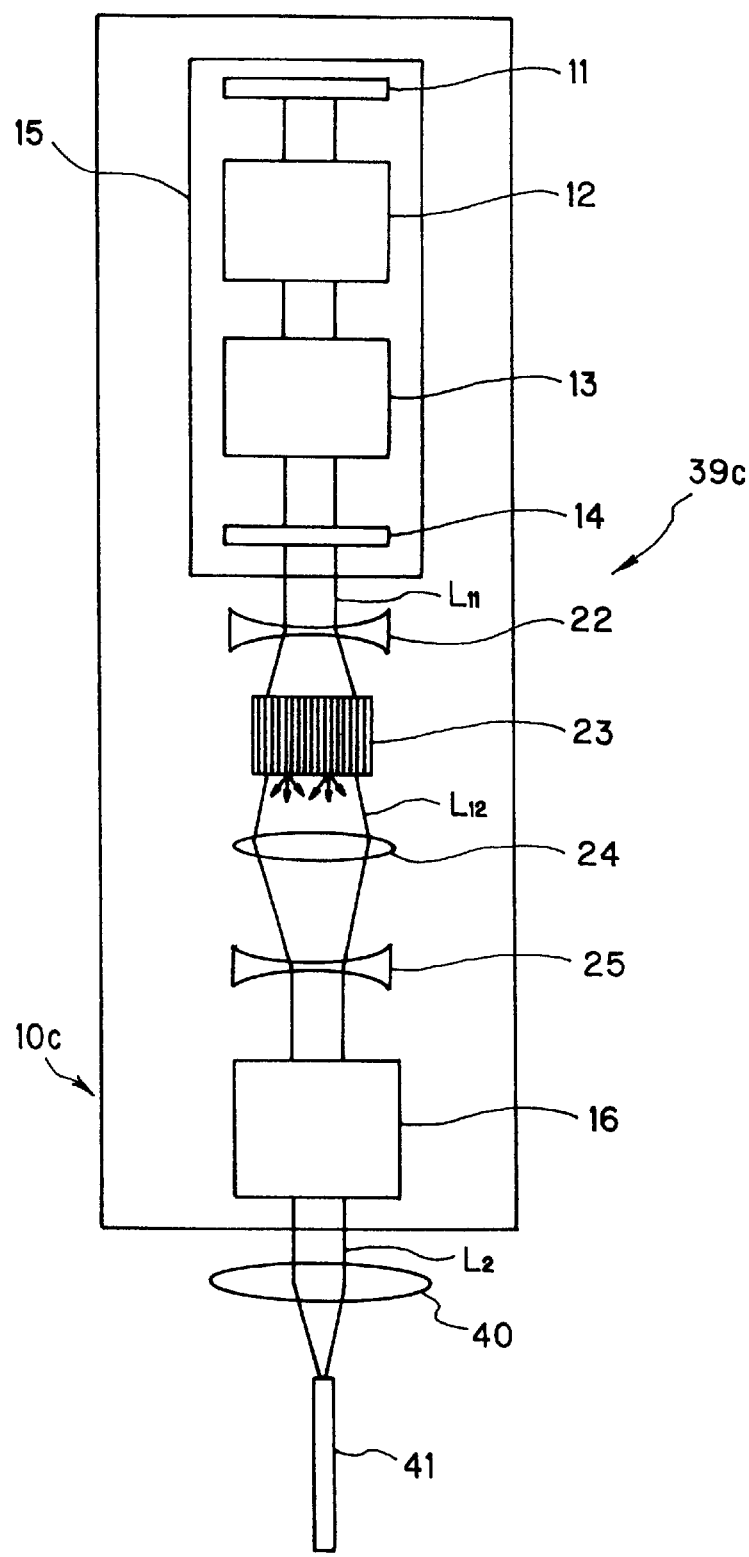
FIG. 14 is a view showing a structure of an optical fiber transmission type laser system in a fourteenth embodiment according to the present invention.

Fourteenth Embodiment (FIG. 14)

FIG. 14 is a view showing a structure of an optical fiber transmission type laser system in the fourteenth embodiment according to the present invention.

This optical fiber transmission type laser system 39c comprises a pulse laser oscillator unit 10c shown in the third embodiment, a condensing lens 40 serving as a condensing optical device condensing a pulse laser beam $L_2$ from the pulse laser oscillator unit 10c and an optical fiber 41 for transmitting the condensed pulse laser beam $L_2$. As the transmission optical fiber 41, an optical fiber of, for example, step index type having a quartz core is used.

In the optical fiber transmission type laser system constituted as stated above, a pulse laser beam $L_2$ having high peak output, a low spatial coherence and a wide spread angle indicative of directivity is radiated from the pulse laser oscillator unit 10c by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has a low spatial coherence, is not converged finely. In addition, due to the uniform spatial intensity distribution, the pulse laser beam $L_2$ does not have a local intensity distribution at the introduction portion of the transmission optical fiber 41.

According to this embodiment, too, the pulse laser beam $L_2$ is not converged finely within the transmission optical fiber 41 and does not have a local intensity peak at the introduction portion of the transmission optical fiber 41, and the optical fiber is not damaged. Thus, if this optical fiber transmission type laser system 39c is used, a pulse laser beam having a high peak output can be transmitted by the transmission optical fiber 41 without damaging the optical fiber 41.

Figure 15:
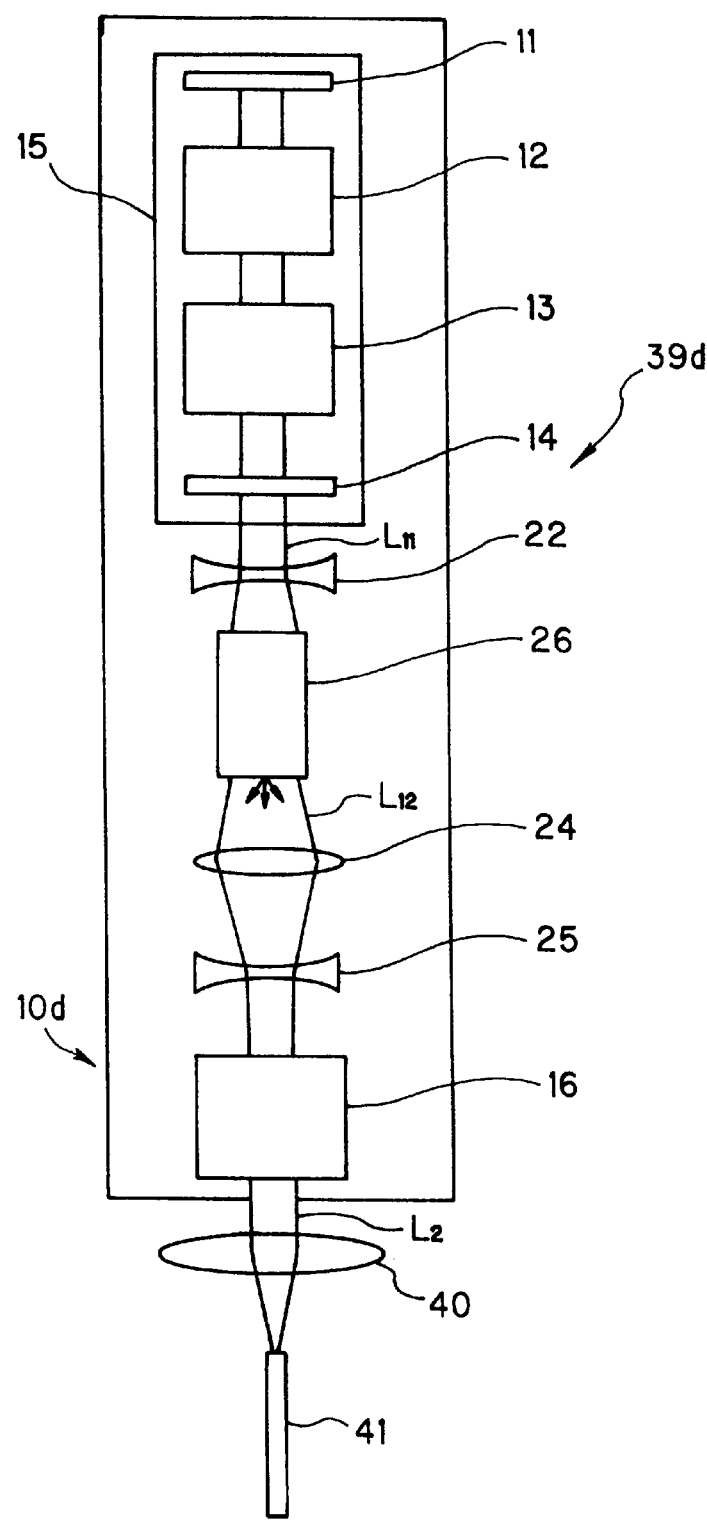
FIG. 15 is a view showing a structure of an optical fiber transmission type laser system in a fifteenth embodiment according to the present invention.

Fifteenth Embodiment (FIG. 15)

FIG. 15 is a view showing a structure of an optical fiber transmission type laser system in the fifteenth embodiment according to the present invention.

This optical fiber transmission type laser system 39d comprises a pulse laser oscillator unit 10d shown in the fourth embodiment, a condensing lens 40 serving as a condensing optical device condensing a pulse laser beam $L_2$ from the pulse laser oscillator unit 10d and an optical fiber 41 for transmitting the condensed pulse laser beam $L_2$. As the transmission optical fiber 41, an optical fiber of, for example, step index type having a quartz core is used.

In the optical fiber transmission type laser system constituted as mentioned above, a pulse laser beam $L_2$ having a high peak output, a low spatial coherence and a wide spread angle indicative of directivity is radiated from the pulse laser oscillator unit 10d by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has low spatial coherence, is not converged finely. In addition, due to the uniform spatial intensity distribution, the pulse laser beam $L_2$ does not have a local intensity peak at the introduction portion of the transmission optical fiber 41.

According to this embodiment, too, the pulse laser beam $L_2$ is not converged finely within the transmission optical fiber 41 and does not have a local intensity peak at the introduction portion of the transmission optical fiber 41, and the optical fiber 41 is not damaged. Thus, if this optical fiber transmission type laser system 39d is used, a pulse laser beam having a high peak output can be transmitted by the transmission optical fiber 41 without damaging the optical fiber 41.

Figure 16:
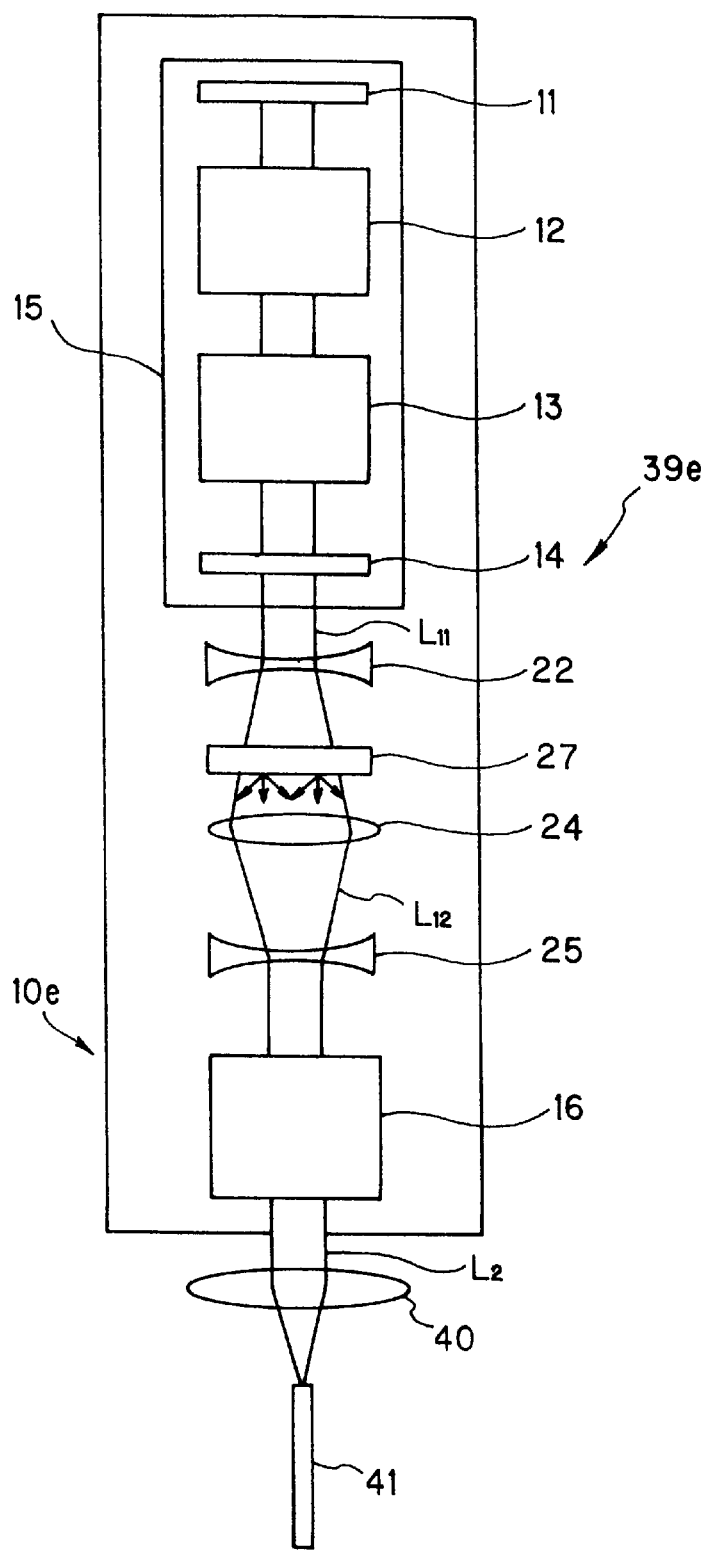
FIG. 16 is a view showing a structure of an optical fiber transmission type laser system in a sixteenth embodiment according to the present invention.

Sixteenth Embodiment (FIG. 16)

FIG. 16 is a view showing a structure of an optical fiber transmission type laser system in the sixteenth embodiment according to the present invention.

This optical fiber transmission type laser system 39e comprises a pulse laser oscillator unit 10e shown in the fifth embodiment, a condensing lens 40 serving as a condensing optical device condensing a pulse laser beam $L_2$ from the pulse laser oscillator unit 10e and an optical fiber 41 for transmitting the condensed pulse laser beam $L_2$. As the transmission optical fiber 41, an optical fiber of, for example, step index type having a quartz core is used.

In the optical fiber transmission type laser system constituted as stated above, a pulse laser beam $L_2$ having high peak output, low spatial coherence and a wide spread angle indicative of directivity is radiated from the pulse laser oscillator unit 10e by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has a low spatial coherence, is not converged thinly. In addition, due to the uniform spatial intensity distribution, the pulse laser beam $L_2$ does not have a local intensity peak at the introduction portion of the transmission optical fiber 41.

According to this embodiment, too, the pulse laser beam $L_2$ is not converged thinly within the transmission optical fiber 41 and does not have a local intensity peak at the introduction portion of the transmission optical fiber 41, and the optical fiber 41 is not damaged. Thus, if this optical fiber transmission type laser system 39e is used, a pulse laser beam having a high output peak can be transmitted by the transmission optical fiber 41 without damaging the transmission optical fiber 41.

Figure 17:
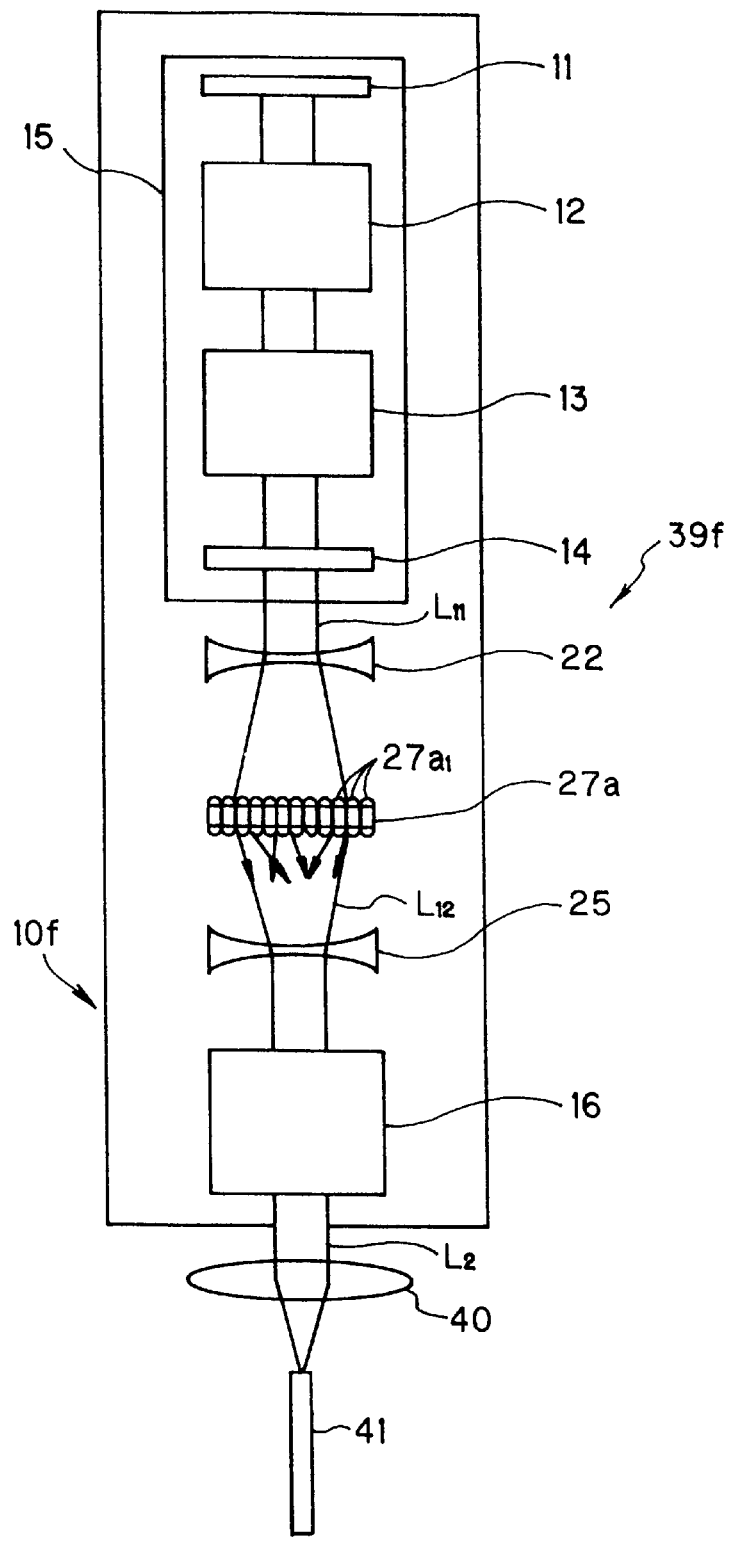
FIG. 17 is a view showing a structure of an optical fiber transmission type laser system in a seventeenth embodiment according to the present invention.

Seventeenth Embodiment (FIG. 17)

FIG. 17 is a view showing a structure of an optical fiber transmission type laser system in the seventeenth embodiment according to the present invention.

This optical fiber transmission type laser system 39f comprises a pulse laser oscillator unit 10f shown in the sixth embodiment, a condensing lens 40 serving as a condensing optical system condensing a pulse laser beam $L_2$ from the pulse laser oscillator unit 10f and an optical fiber 41 for transmitting the condensed pulse laser beam $L_2$. As the transmission optical fiber 41, an optical fiber of, for example, step index type having a quartz core is used.

In the optical fiber transmission type laser system constituted as mentioned above, a pulse laser beam $L_2$ having a high peak output, a low spatial coherence and a wide spread angle indicative of directivity is radiated from the pulse laser oscillator unit 10f by the function described in the first embodiment. This pulse laser beam $L_2$ is condensed by the condensing lens 40 and introduced into the transmission optical fiber 41. Even if the pulse laser beam $L_2$ is reflected and converged on the interface between the concave core and a clad, the pulse laser beam $L_2$, which has a low spatial coherence, is not converged finely. In addition, due to the uniform spatial intensity distribution, the pulse laser beam $L_2$ does not have a local intensity peak at the introduction portion of the transmission optical fiber 41.

According to this embodiment, too, the pulse laser beam $L_2$ is not converged finely within the transmission optical fiber 41 and does not have a local intensity peak at the introduction portion of the transmission optical fiber 41, and the optical fiber 41 is not damaged. Thus, if this optical fiber transmission type laser system 39f is used, a pulse laser beam having high output peak can be transmitted by the transmission optical fiber 41 without damaging the optical fiber 41.

Figure 18:
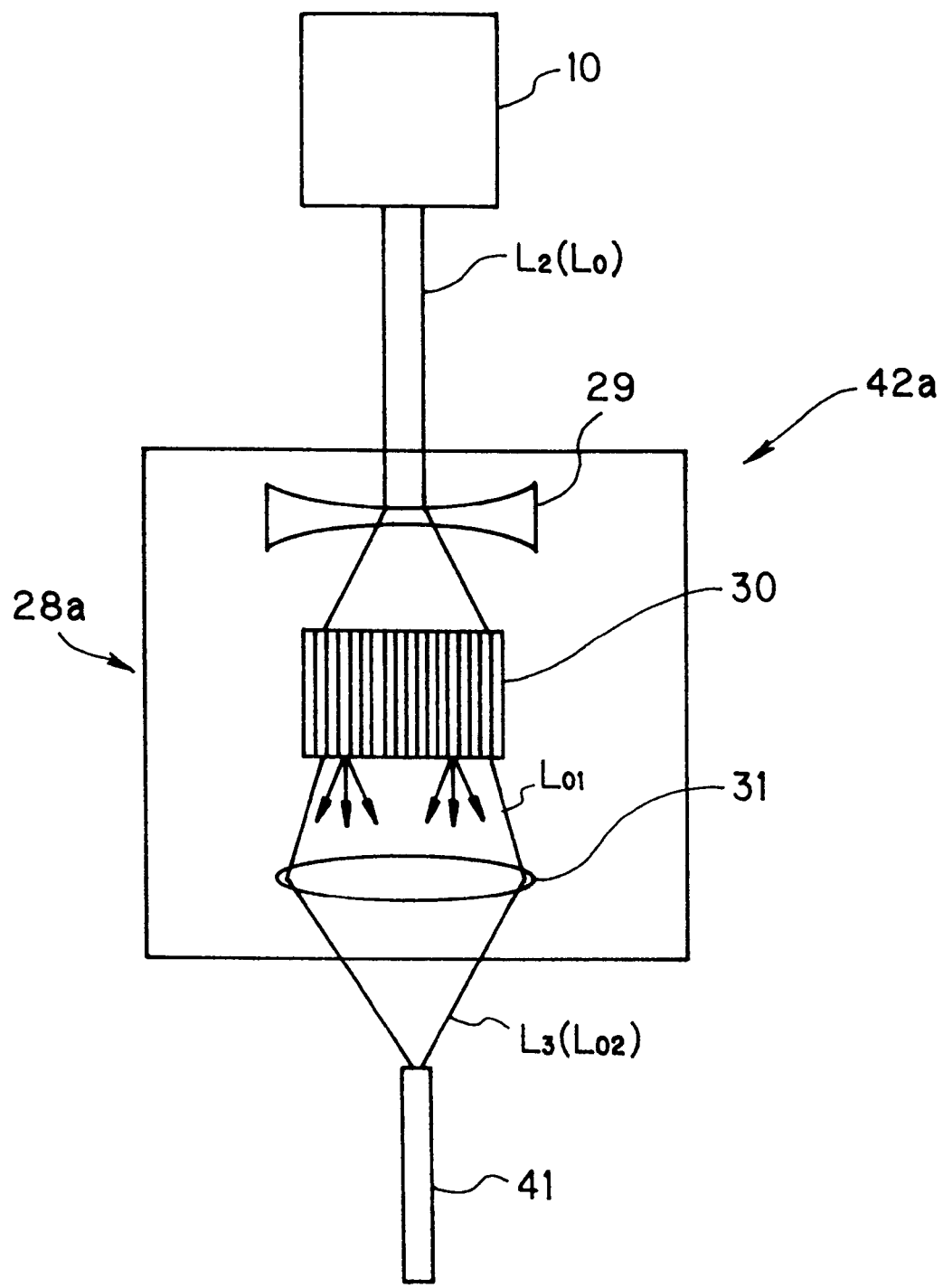
FIG. 18 is a view showing a structure of an optical fiber transmission type laser system in an eighteenth embodiment according to the present invention.

Eighteenth Embodiment (FIG. 18)

FIG. 18 is a view showing a structure of an optical fiber transmission type laser system in the eighteenth embodiment according to the present invention.

This optical fiber transmission type laser system 42a comprises a pulse laser oscillator unit 10, a pulse laser beam guide device 28a shown in the seventh embodiment and a transmission optical fiber 41. As the pulse laser oscillator unit 10, a Q-switch type YAG laser oscillator, a Q-switch type SH-YAG laser oscillator or the like is applicable. It is also possible to apply one of the pulse laser oscillator units 10a to 10f described in the first to sixth embodiments to the pulse laser oscillator unit 10. As the transmission optical fiber 41, an optical fiber of, for example, step index type having a quartz core is used.

Next, the function of this optical fiber transmission type laser system 42a will be described. A pulse laser beam $L_2$ having a high peak output is radiated from the pulse laser oscillator unit 10. This pulse laser beam $L_2$ which turns into a pulse laser beam $L_3$ condensed by the beam guide device 29a, is introduced into the transmission optical fiber 41. By the function described in the seventh embodiment, the pulse laser beam $L_3$ is not converged finely within the transmission optical fiber 41 and does not have a local intensity peak at the introduction portion of the transmission optical fiber 41.

According to this embodiment, since the optical fiber beam guide device 28a into which the FOP 30 is inserted is applied, the pulse laser $L_3$ is not converged thinly within the transmission optical fiber 41 and does not have a local intensity peak at the introduction portion of the transmission optical fiber 41, and the optical fiber is not damaged. Thus, if this optical fiber type laser device is used, a pulse laser beam having a high peak output can be transmitted by the optical fiber without damaging the optical fiber.

Figure 19:
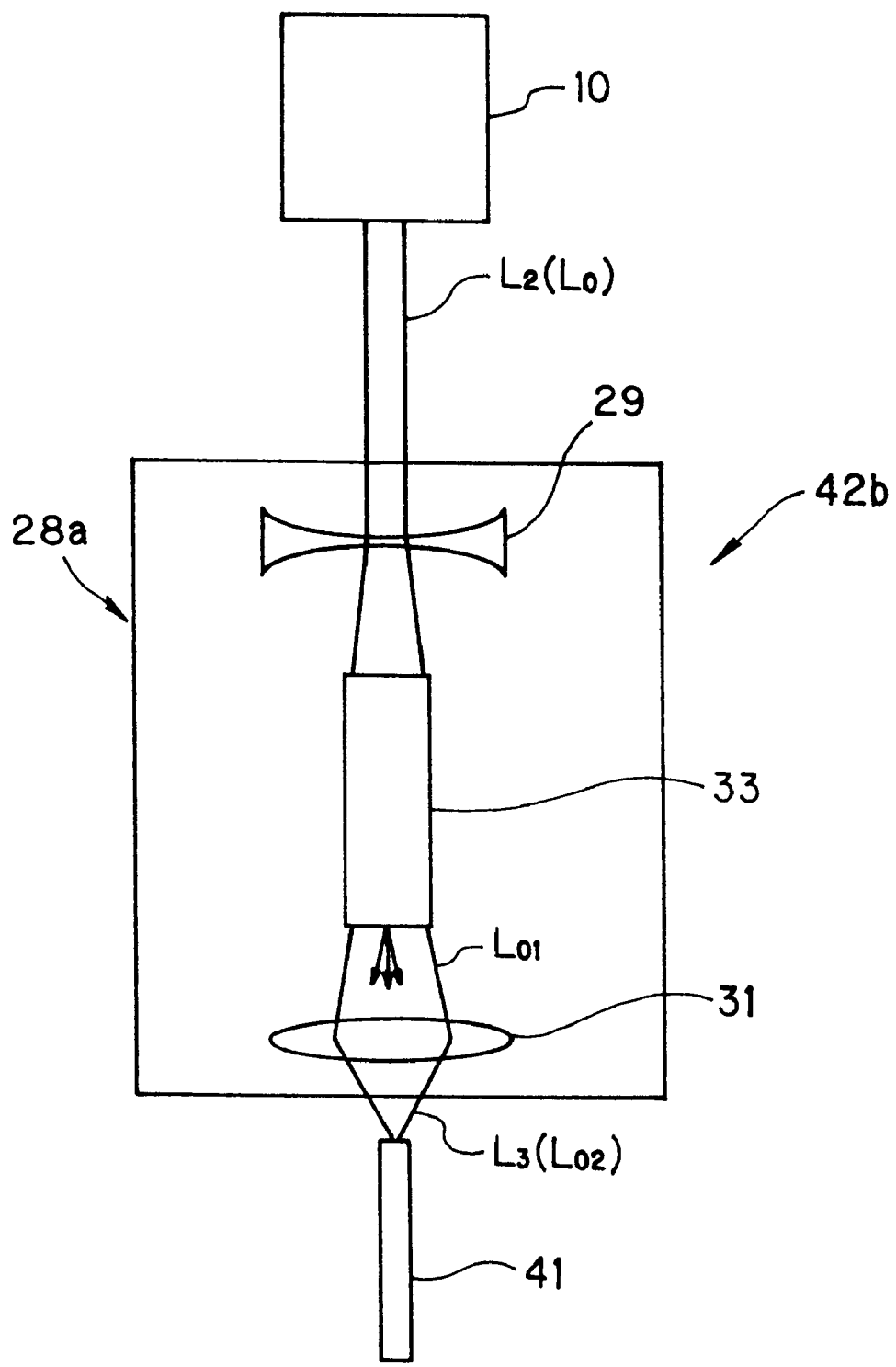
FIG. 19 is a view showing a structure of an optical fiber transmission type laser system in a nineteenth embodiment according to the present invention.

Nineteenth Embodiment (FIG. 19)

FIG. 19 is a view showing a structure of an optical fiber transmission type laser system in the nineteenth embodiment according to the present invention.

This optical fiber transmission type laser system 42b comprises a pulse laser oscillator unit 10, a beam guide device 28b shown in the eighth embodiment and a transmission optical fiber 41. As the pulse laser oscillator 10, a Q-switch type YAG laser oscillator, a Q-switch type SH-YAG laser oscillator or the like is applicable. It is also possible to apply one of the pulse laser oscillator units 10a to 10f described in the first to sixth embodiments to the pulse laser oscillator unit 10. As the transmission optical fiber 41, an optical fiber of, for example, step index type having a quartz core is used.

Next, the function of this optical fiber transmission type laser system 42b will be described. A pulse laser beam $L_2$ having a high peak output is radiated from the pulse laser oscillator unit 10. This pulse laser beam $L_2$ which turns into a pulse laser beam $L_3$ condensed by the optical fiber beam guide device 28b, is introduced into the transmission optical fiber 41. By the function described in the eighth embodiment, the pulse laser beam $L_3$ is not converged finely within the transmission optical fiber 41 and does not have a local intensity peak at the introduction portion of the transmission optical fiber 41.

According to this embodiment, since the beam guide device 28b into which the kaleidoscope 33 is inserted is applicable, the pulse laser beam $L_3$ is not converged finely within the transmission optical fiber 41 and does not have a local intensity peak at the introduction portion of the transmission optical fiber 41,and the optical fiber is not damaged. Thus, if this optical fiber type laser system is used, a pulse laser beam having a high peak output can be transmitted by the optical fiber without damaging the optical fiber.

Figure 20:
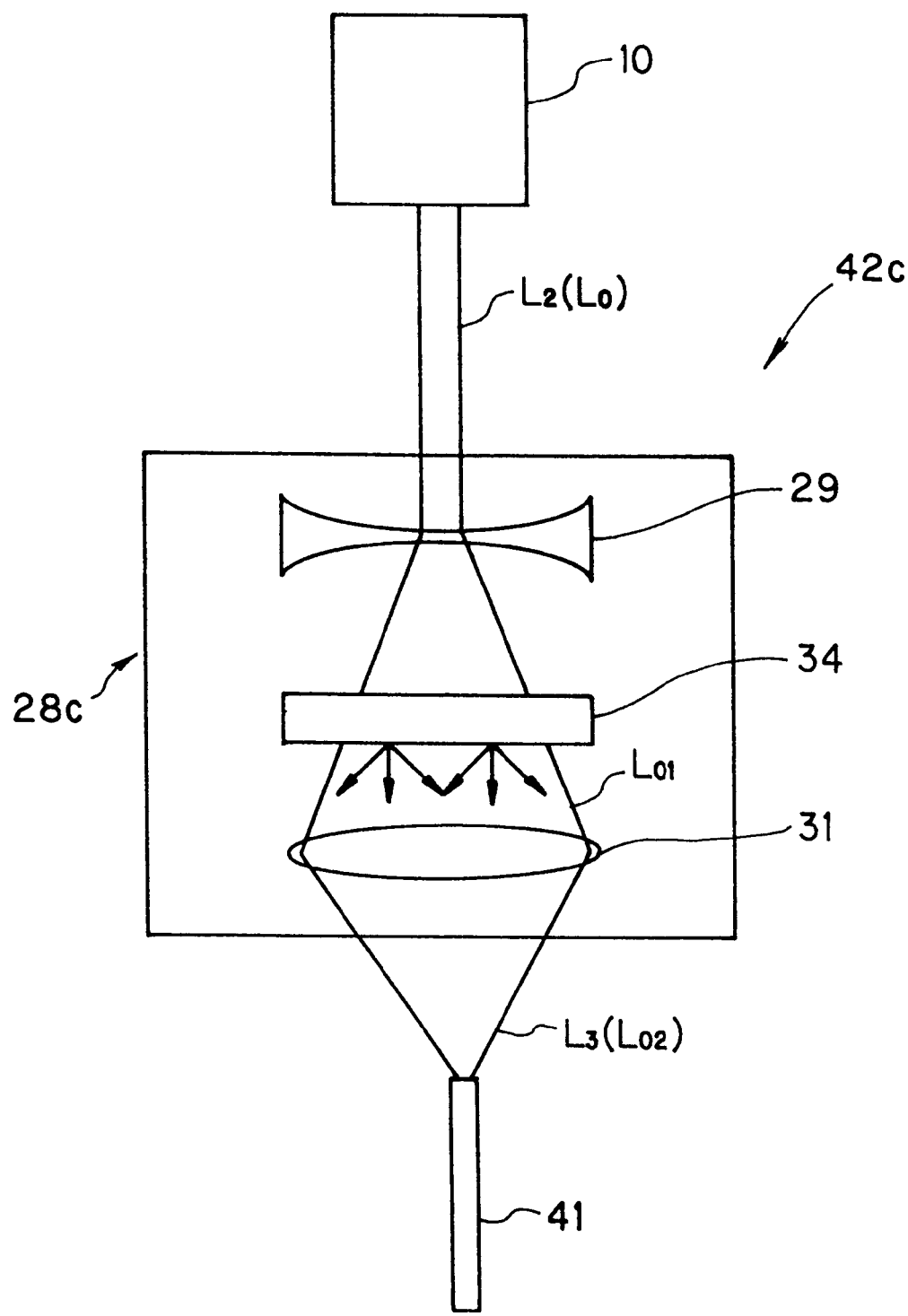
FIG. 20 is a view showing a structure of an optical fiber transmission type laser system in a twentieth embodiment according to the present invention.

Twentieth Embodiment (FIG. 20)

FIG. 20 is a view showing a structure of an optical fiber transmission type laser system in the twentieth embodiment according to the present invention.

This optical fiber transmission type laser system 42c comprises a pulse laser oscillator unit 10, a beam guide device 28c shown in the ninth embodiment and a transmission optical fiber 41. As the pulse laser oscillator unit 10, a Q-switch type YAG laser oscillator, a Q-switch type SH-YAG laser oscillator or the like is applicable. It is also possible to apply one of the pulse laser oscillator units 10a to 10f described in the first to sixth embodiments to the pulse laser oscillator unit 10. As the transmission optical fiber 41, an optical fiber of, for example, step index type having a quartz core, is used.

Next, the function of this optical fiber transmission type laser system 42c will be described. A pulse laser beam $L_2$ having a high peak output is radiated from the pulse laser oscillator 10. This pulse laser beam $L_2$ which turns into a pulse laser beam $L_3$ condensed by the beam guide device 28c, is introduced into the transmission optical fiber 41. By the function described in the ninth embodiment, the pulse laser beam $L_3$ is not converged finely within the transmission optical fiber 41 and does not have a local intensity peak at the introduction portion of the transmission optical fiber 41.

According to this embodiment, since the beam guide device 28c, into which the diffusion beam transmitting plate 34 is inserted, is applied, the pulse laser beam $L_3$ is not converged finely within the transmission optical fiber 41 and does not have a local intensity peak at the introduction portion of the transmission optical fiber 41, and the optical fiber is not damaged. Thus, if this optical fiber type laser system is used, a pulse laser beam having high peak output can be transmitted by the optical fiber without damaging the optical fiber.

Figure 21:
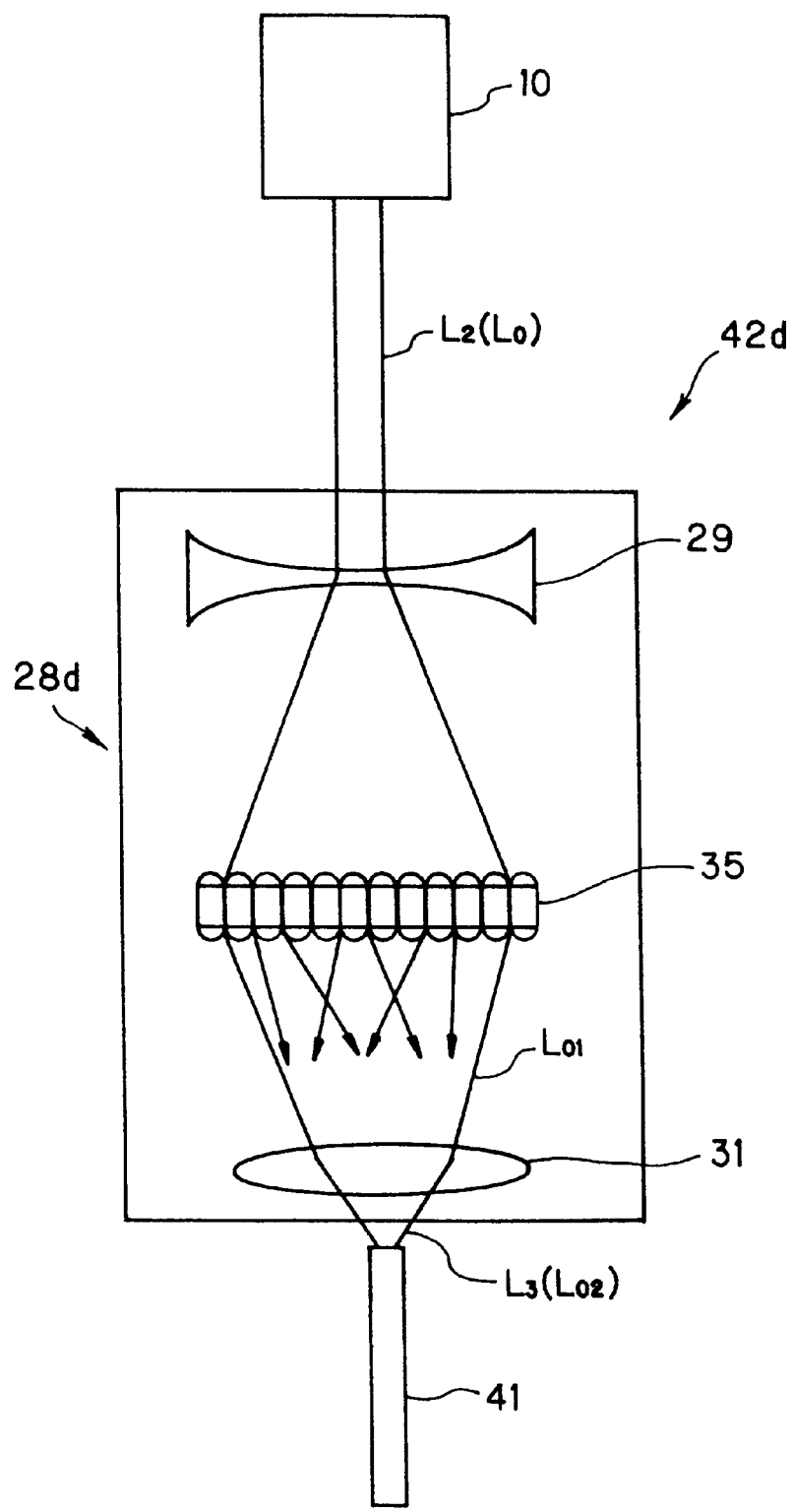
FIG. 21 is a view showing a structure of an optical fiber transmission type laser system in a twenty-first embodiment according to the present invention.
Figure 22:
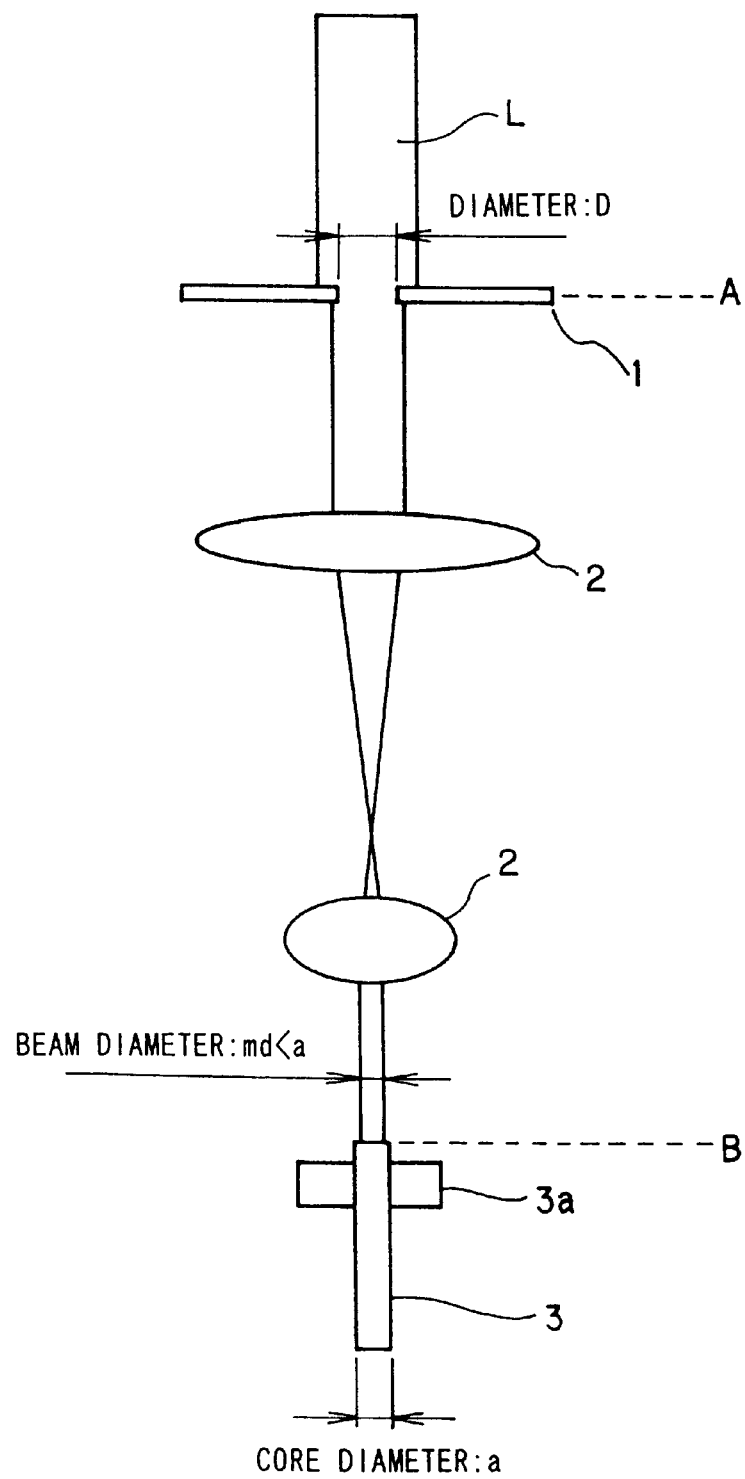
FIG. 22 is a view showing a conventional case of employing a beam guide device by means of image formation.
Figure 23:
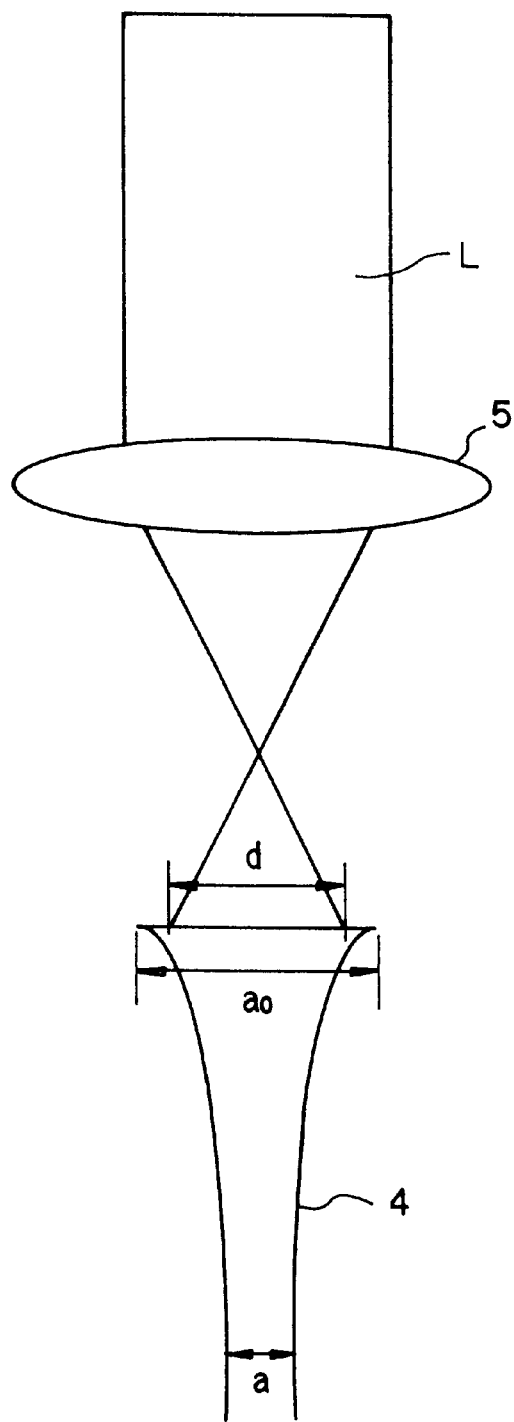
FIG. 23 is a view showing a conventional case of employing a taper fiber.

Twenty-first Embodiment (FIG. 21)

FIG. 21 is a view showing a structure of an optical fiber transmission type laser system in the twenty-first embodiment according to the present invention.

This optical fiber transmission type laser system 42d comprises a pulse laser oscillator unit 10, a beam guide device 28d shown in the tenth embodiment and a transmission optical fiber 41. As the pulse laser oscillator unit 10, a Q-switch type YAG laser oscillator, a Q-switch type SH-YAG laser oscillator or the like is applicable. It is also possible to apply one of the pulse laser oscillator units 10a to 10f described in the first to sixth embodiments to the pulse laser oscillator unit 10. As the transmission optical fiber 41, an optical fiber of, for example, step index type having a quartz core is used.

Next, the function of this optical fiber transmission type laser system 42d will be described. A pulse laser beam $L_2$ having a high peak output is radiated from the pulse laser oscillator unit 10. This pulse laser beam $L_2$ which turns into a pulse laser beam $L_3$ condensed by the optical fiber beam guide device 28d, is introduced into the transmission optical fiber 41. By the function described in the tenth embodiment, the pulse laser beam $L_3$ is not converged finely within the transmission optical fiber 41 and does not have a local intensity peak at the introduction portion of the transmission optical fiber 41.

According to this embodiment, since the beam guide device 28d into which the lens (microlens) array 35 is inserted is applied, the pulse laser $L_3$ is not converged finely within the transmission optical fiber 41 and does not have a local intensity peak at the introduction portion of the transmission optical fiber 41, and the optical fiber is not damaged. Thus, if this optical fiber type laser system is used, a pulse laser beam having high peak output can be transmitted by the optical fiber without damaging the optical fiber.

The following Table 1 shows the results of tests effected by using the eighteenth to twenty-first embodiments of the present invention mentioned above, in which the maximum energies (damage threshold levels) which can be transmitted or delivered without damaging the laser beam transmission optical fiber 41 were measured in the cases of the above four embodiments and in the case of using only the conventional condensing lens 31.

In the case of the conventional condensing lens 31, the damage of threshold level was 10 mJ (milli Joule). However, in the cases of the above four embodiments of the present invention, these levels were in range of 30–50 mJ, and hence, it is possible to transmit the laser beam having higher intensity. As the damage threshold level becomes larger, the system becomes more practical. In a laser peening technology, in order to obtain an adequate impact effect, it is better to converge the laser beam on a spot having energy density more than a certain level, and the spot diameter can be made large by transmitting the large amount of energy, so that the transmitting speed can be made fast. Furthermore, in a case where the same energy is transmitted, the core diameter of the optical fiber can be made small as the damage threshold level becomes large. The optical fiber becomes larger in diameter, the bending radius thereof becomes larger. In one example, the bending radius is limited to a value more than 200 times of the fiber core diameter. Accordingly, If the laser beam of 40 mJ can be transmitted in comparison with that of 10 mJ, the core diameter, the bending radius can be made small to be ½, and accordingly, the optical fiber can be applicable to a fine and bent pipe having a complicated shape.

TABLE 1

| (Quartz Fiber: Core Diameter: 1.2 mm) | |
|---|---|
| Type of Incidence (Using) | Damage Threshold Level (mJ) |
| Condensing Lens | 10 |
| FOP | 30 |
| Diffusion Plate | 40 |
| Kaleidoscope | 40 |
| Lens Array | 50 |

(Wavelength: 532 mm; Pulse Width: 5 ns; 10 Hz/sec.)

It is to be noted that the present invention is not limited to the described embodiments and many other changes, modifications and combinations may be made without departing from the scopes of the appended claims.

What is claimed is:

1. A laser transmission system comprising:

a Q-switch laser oscillator unit;

a beam guide unit having an optical condensing unit for condensing a pulse laser beam radiated from the Q-switch laser oscillator unit;

an optical fiber unit for transmitting the pulse laser beam condensed by the beam guide unit; and means for reducing a coherence of the pulse laser beam provided for at least one of said Q-switch laser oscillator unit, said beam guide unit and said optical fiber unit, wherein said means for reducing a coherence includes a means for making substantially uniform distribution of laser beams at a beam entrance portion of the optical fiber unit and preventing the laser beams from focusing on one point in the optical fiber unit.

2. A laser transmission system according to claim 1, wherein said Q-switch laser oscillator unit comprises a laser resonator including a rear mirror, an oscillator, an outgoing mirror and a pulse generator, said rear mirror having a beam reflection surface subjected to a matte finish treatment.

3. A laser transmission system according to claim 1, wherein said laser oscillator unit comprises a laser resonator including a rear mirror, an oscillator, an outgoing mirror, a pulse generator, and a diffusion optical fiber through which an outgoing beam from the laser resonator passes.

4. A laser transmission system according to claim 1, wherein said laser oscillator unit comprises a laser resonator including a rear mirror, an oscillator, an outgoing mirror, a pulse generator, and an optical fiber plate through which an outgoing beam from the laser resonator passes.

5. A laser transmission system according to claim 1, wherein said laser oscillator unit comprises a laser resonator including a rear mirror, an oscillator, an outgoing mirror, a pulse generator, and a kaleidoscope through which an outgoing beam from the laser resonator passes.

6. A laser transmission system according to claim 1, wherein said laser oscillator unit comprises a laser resonator including a rear mirror, an oscillator, an outgoing mirror, a pulse generator, and a beam transmitting plate for diffusion through which an outgoing beam from the laser resonator passes.

7. A laser transmission system according to claim 1, wherein said laser oscillator unit comprises a laser resonator including a rear mirror, an oscillator, an outgoing mirror, a pulse generator, and a lens array through which an outgoing beam from the laser resonator passes.

8. A laser transmission system according to claim 1, wherein said beam guide unit includes an optical fiber plate through which the pulse laser beam passes and a condensing optical device for condensing an outgoing beam from the optical fiber plate to said optical fiber unit.

9. A laser transmission system according to claim 1, wherein said beam guide unit includes a kaleidoscope through which the pulse laser beam passes and a condensing optical device for condensing an outgoing beam from the kaleidoscope to said optical fiber unit.

10. A laser transmission system according to claim 1, wherein said beam guide unit includes a beam transmitting plate for diffusion through which the pulse laser beam passes and a condensing optical device for condensing an outgoing beam from the beam transmission plate to said optical fiber unit.

11. A laser transmission system according to claim 1, wherein said beam guide unit includes a lens array through which the pulse laser beam passes and a condensing optical device for condensing an outgoing beam from the lens array to said optical fiber unit.

12. A laser transmission system comprising:

a Q-switch laser oscillator unit;

a beam guide unit having an optical condensing unit for condensing a pulse laser beam radiated from the Q-switch laser oscillator unit;

an optical fiber unit for transmitting the pulse laser beam condensed by the beam guide unit; and means for reducing a coherence of the pulse laser beam provided for at least one of said Q-switch laser oscillator unit, said beam guide unit and said optical fiber unit, wherein said optical fiber unit has a central core having at least one end formed in a prismatic shape.

13. A method of transmitting light comprising:

providing a Q-switch laser oscillator unit, a beam guide unit having an optical condensing unit for condensing a pulse laser beam radiated from the Q-switch laser oscillator unit, and an optical fiber unit for transmitting the pulse laser beam condensed by the beam guide unit; and reducing a coherence of the pulse laser beam provided for at least one of said Q-switch laser oscillator unit, said beam guide unit and said optical fiber unit, wherein said reducing a coherence includes making a substantially uniform distribution of laser beams at a beam entrance portion of the optical fiber unit and preventing the laser beams from focusing on one point in the optical fiber unit.

* * * * *